United States Patent
Kubota et al.

(10) Patent No.: US 7,717,435 B2
(45) Date of Patent: May 18, 2010

(54) SPHERICAL ANNULAR SEAL MEMBER

(75) Inventors: Shuichi Kubota, Fujisawa (JP); Kouhei Kurose, Fujisawa (JP)

(73) Assignee: Oiles Corporation, Tokyo (JP)

( * ) Notice: Subject to any disclaimer, the term of this patent is extended or adjusted under 35 U.S.C. 154(b) by 5 days.

(21) Appl. No.: 11/822,484

(22) Filed: Jul. 6, 2007

(65) Prior Publication Data
US 2007/0257443 A1    Nov. 8, 2007

Related U.S. Application Data

(62) Division of application No. 10/530,717, filed as application No. PCT/JP03/012782 on Oct. 6, 2003, now Pat. No. 7,413,195.

(30) Foreign Application Priority Data
Oct. 8, 2002    (JP)    ............................. 2002-295454

(51) Int. Cl.
*F16J 15/12*    (2006.01)
(52) U.S. Cl. ..................... 277/650; 277/651; 277/627
(58) Field of Classification Search ................ 277/611, 277/627, 650–654
See application file for complete search history.

(56) References Cited

U.S. PATENT DOCUMENTS

| | | | |
|---|---|---|---|
| 3,719,608 A | 3/1973 | Olstowski | |
| 4,146,401 A | 3/1979 | Yamada et al. | |
| 4,547,434 A | 10/1985 | Sumiyoshi et al. | |
| 4,551,393 A | 11/1985 | Sumiyoshi et al. | |
| 4,951,954 A | 8/1990 | MacNeill | |
| 5,194,198 A | 3/1993 | Von Bonin et al. | |
| 5,288,429 A | 2/1994 | Von Bonin et al. | |
| 5,382,387 A | 1/1995 | Von Bonin | |

(Continued)

FOREIGN PATENT DOCUMENTS

EP    1 211 221 A1    6/2002

(Continued)

OTHER PUBLICATIONS

International Search Report mailed Feb. 17, 2004.

*Primary Examiner*—Thomas B Will
*Assistant Examiner*—Gilbert Y Lee
(74) *Attorney, Agent, or Firm*—Nixon & Vanderhye P.C.

(57) ABSTRACT

A spherical annular seal member (58) includes: a spherical annular base member (56) defined by a cylindrical inner surface (52), a partially convex spherical surface (56), and end faces (54, 55); and an outer layer (57) formed integrally with the partially convex spherical surface (53) of the spherical annular base member (56). The spherical annular base member (56) includes a reinforcing member (5) made from a compressed metal wire net (4) and a heat-resistant material filling meshes of the metal wire net (4) of the reinforcing member (5), integrated with the reinforcing member (5) in mixed form, and containing expanded graphite and an organic phosphorus compound. The outer layer (56) includes a heat-resistant material constituted by a heat-resistant sheet member (6) containing expanded graphite and an organic phosphorus compound, and a reinforcing member constituted by a metal wire net (4) integrated with the heat-resistant material in mixed formed.

9 Claims, 7 Drawing Sheets

U.S. PATENT DOCUMENTS

| | | | |
|---|---|---|---|
| 5,499,825 | A | 3/1996 | Maeda et al. |
| 5,615,479 | A | 4/1997 | Maeda et al. |
| 5,909,881 | A | 6/1999 | Segawa et al. |
| 5,997,979 | A | 12/1999 | Kashima |
| 6,102,995 | A | 8/2000 | Hutchings et al. |
| 6,152,453 | A | 11/2000 | Kashima et al. |
| 6,746,768 | B2 | 6/2004 | Greinke et al. |
| 6,889,983 | B2 | 5/2005 | Murakami et al. |
| 2002/0190483 | A1 | 12/2002 | Murakami et al. |
| 2005/0253115 | A1 | 11/2005 | Kubota et al. |

FOREIGN PATENT DOCUMENTS

| | | |
|---|---|---|
| JP | 55-118987 | 9/1980 |
| JP | 01-252512 | 10/1989 |
| JP | 2635108 | 7/1997 |
| JP | 10-101316 | 4/1998 |
| JP | 10-110158 | 4/1998 |
| JP | 2001-131426 | 5/2001 |
| JP | 2001-153230 | 6/2001 |
| JP | 2001-262146 | 9/2001 |
| JP | 2002-69286 | 3/2002 |
| JP | 2002-265799 | 9/2002 |

F I G. 1
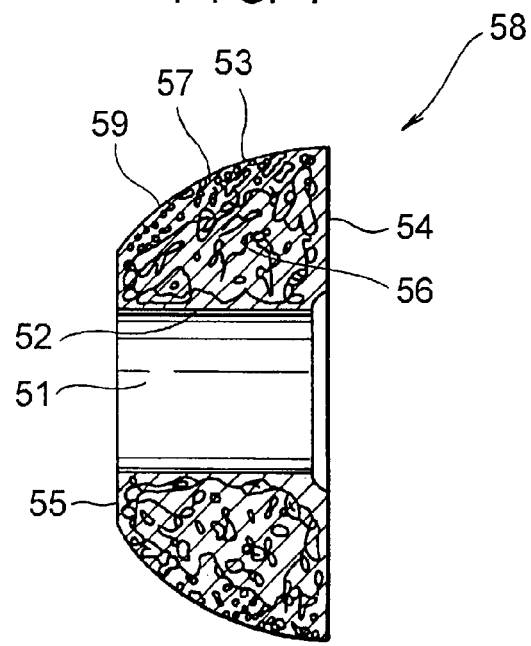
F I G. 2
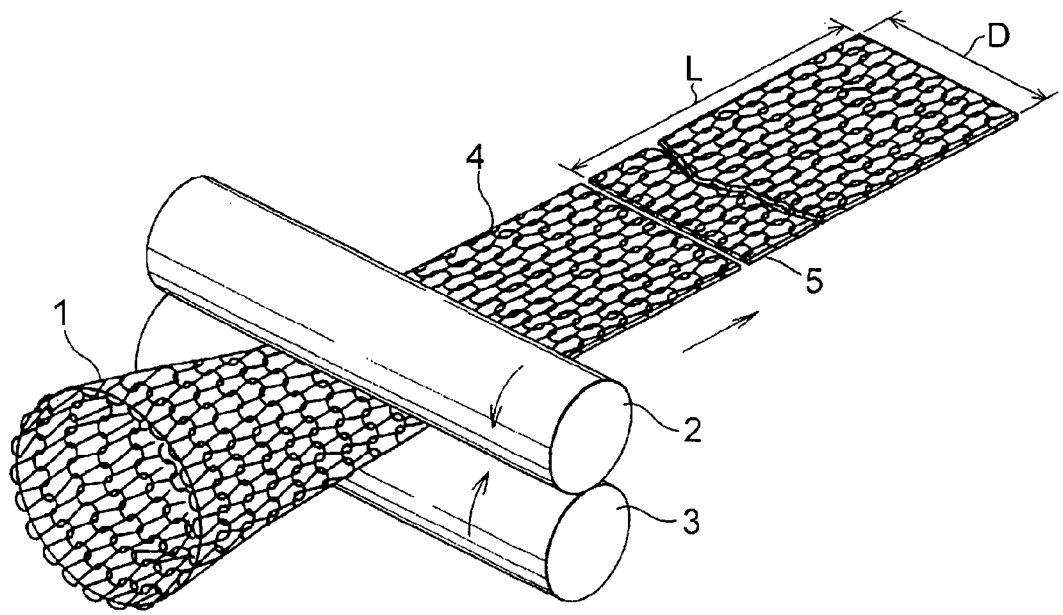

SPHERICAL ANNULAR SEAL MEMBER

This application is a divisional of application Ser. No. 10/530,717 filed Apr. 8, 2005 now U.S. Pat. No. 7,413,195, which in turn is the US national phase of international application PCT/JP03/012782 filed Oct. 6, 2003 which designated the U.S. and claims benefit of JP-2002-295454, dated Oct. 8, 2002, the entire contents of each of which are hereby incorporated by reference.

TECHNICAL FIELD

The present invention relates to a spherical annular seal member used in a spherical pipe joint for an automobile exhaust pipe.

BACKGROUND ART

A conventional spherical annular seal member used in a spherical pipe joint for an automobile exhaust pipe is heat resistant, excels in affinity with a mating member, and has remarkably improved impact strength, but has a drawback in that the seal member often generates abnormal noise when it undergoes friction under dry frictional conditions (published in JP-A-54-76759). The drawback of this seal member is conceivably attributable to, among others, the fact that there is a large difference between the coefficient of static friction and the coefficient of dynamic friction of a heat-resistant material (such as expanded graphite) for forming the seal member, and to the fact that the seal member constituted by this heat-resistant material exhibits negative resistance with respect to the sliding velocity or speed.

Therefore, to overcome the above-described drawback, the present applicant proposed a seal member which excels in the sealing characteristic without generating abnormal frictional noise in the sliding on a mating member, and satisfies the performance required of a seal member (Japanese Patent No. 3,139,179).

However, with respect to this proposed seal member as well, a new problem has been presented which is attributable to, among others, the improvement in recent years of the performance of automobile engines. That is, the conventional seal members are unable to satisfy the conditions of use in the light of heat resistance, owing to an increase in the exhaust-gas temperature due to the improved performance of the automobile engines, or owing to an increase in the exhaust-gas temperature attributable to the fact that the spherical pipe joint is located closer to the engine side in a case where the spherical pipe joint is disposed in the vicinity of an outlet (manifold) of the exhaust gases, for the purpose of improving the noise, vibration and harshness (NVH) characteristics of an automobile. Thus, there has been a compelling need for improvement of the heat resistance of the seal member itself.

With respect to the above-described newly presented problem, the present applicant proposed spherical annular seal members and methods of manufacturing the same in which heat resistance is improved (JP-A-10-9396 and JP-A-10-9397).

The above-described spherical annular seal members are capable of suppressing the oxidative wear to low levels, do not generate abnormal frictional noise, excel in sealing characteristics, and are capable of satisfying their functions as seal members even under high temperatures of 600° C. to 700° C. However, in the case of these spherical annular seal members, since a heat-resistant sheet member, e.g., a heat-resistant sheet member having on the surfaces of an expanded graphite sheet a heat-resistant coating formed of heat-resistant materials, is used in the manufacturing methods, the flexibility inherent in the expanded graphite sheet is sacrificed. In consequence, there are possibilities that the cracking, breakage, and the like of the heat-resistant coating and, hence, the breakage and the like of the heat-resistant sheet member can often occur in the bending operation and the like involved in the process of manufacturing the spherical annular seal member. Thus, it was found that there is room for improvement in terms of the material yield, and that the elimination of the drawback of the material yield has the advantage of shortening the process of manufacturing the spherical annular seal member, leading to the reduction of the manufacturing cost.

DISCLOSURE OF THE INVENTION

The present invention has been devised in view of the above-described aspects, and its object is to provide a spherical annular seal member which exhibits performance equivalent to that of the spherical annular seal members of the above-described prior art in that the spherical annular seal member has heat resistance (resistance to oxidative wear), does not generate abnormal frictional noise, and excels in the sealing characteristic even in a high-temperature range exceeding 700° C., and which, in its manufacturing method, is capable of overcoming the drawback of the material yield of the heat-resistant sheet member and of lowering the manufacturing cost.

A spherical annular seal member in accordance with a first aspect of the present invention is a spherical annular seal member which is used particularly in an exhaust pipe spherical joint, comprising: a spherical annular base member defined by a cylindrical inner surface, a partially convex spherical surface, and large-and small-diameter-side annular end faces of the partially convex spherical surface; and an outer layer formed integrally with the partially convex spherical surface of the spherical annular base member, wherein the spherical annular base member includes a reinforcing member made from a compressed metal wire net and a heat-resistant material filling meshes of the metal wire net of the reinforcing member, compressed in such a manner as to be formed integrally with the reinforcing member in mixed form, and containing expanded graphite and an organic phosphorus compound, the outer layer includes a heat-resistant material containing expanded graphite and an organic phosphorus compound, and a reinforcing member constituted by a metal wire net integrated with the heat-resistant material in mixed formed, and an outer surface of the partially convex spherical surface exposed to an outside in the outer layer is formed into a smooth surface in which the heat-resistant material and the reinforcing member are integrated in mixed form.

In accordance with the spherical annular seal member according to the first aspect, the spherical annular base member defined by the cylindrical inner surface, the partially convex spherical surface, and the large-and small-diameter-side annular end faces of the partially convex spherical surface includes a reinforcing member made from a compressed metal wire net and a heat-resistant material filling meshes of the metal wire net of the reinforcing member, compressed in such a manner as to be formed integrally with the reinforcing member in mixed form, and containing expanded graphite and an organic phosphorus compound. Therefore, the oxidative wear of expanded graphite constituting a principal ingredient of the heat-resistant material is reduced even in a high-temperature range exceeding 700° C. by virtue of the oxidation suppressing action of the organic phosphorus compound, with the result that the heat resistance of the spherical annular seal member improves.

In addition, the outer layer includes a heat-resistant material containing expanded graphite and an organic phosphorus compound, and a reinforcing member constituted by a metal wire net integrated with the heat-resistant material in mixed formed, and an outer surface of the partially convex spherical surface exposed to an outside in the outer layer is formed into a smooth surface in which the heat-resistant material and the reinforcing member are integrated in mixed form. Therefore, the oxidative wear of expanded graphite constituting the principal ingredient of the heat-resistant material is reduced even in a high-temperature range exceeding 700° C. by virtue of the oxidation suppressing action of the organic phosphorus compound. Hence, in the sliding contact with a mating member, the formation of an excess coating of the heat-resistant material which forms an outer surface layer on the surface of the mating member is suppressed, and smooth sliding contact with the surface of the mating member is effected.

A spherical annular seal member in accordance with a second aspect of the present invention is a spherical annular seal member which is used particularly in an exhaust pipe spherical joint, comprising: a spherical annular base member defined by a cylindrical inner surface, a partially convex spherical surface, and large-and small-diameter-side annular end faces of the partially convex spherical surface; and an outer layer formed integrally with the partially convex spherical surface of the spherical annular base member, wherein the spherical annular base member includes a reinforcing member made from a compressed metal wire net and a heat-resistant material filling meshes of the metal wire net of the reinforcing member, compressed in such a manner as to be formed integrally with the reinforcing member in mixed form, and containing expanded graphite and an organic phosphorus compound, the outer layer includes a lubricating composition constituted of at least boron nitride and at least one of alumina and silica, and a reinforcing member constituted by a metal wire net integrated with the lubricating composition in mixed formed, and an outer surface of the partially convex spherical surface exposed to an outside in the outer layer is formed into a smooth lubricating sliding surface in which the lubricating composition and the reinforcing member are integrated in mixed form.

In accordance with the spherical annular seal member according to the second aspect, the spherical annular base member defined by the cylindrical inner surface, the partially convex spherical surface, and the large-and small-diameter-side annular end faces of the partially convex spherical surface includes a reinforcing member made from a compressed metal wire net and a heat-resistant material filling meshes of the metal wire net of the reinforcing member, compressed in such a manner as to be formed integrally with the reinforcing member in mixed form, and containing expanded graphite and an organic phosphorus compound. Therefore, the oxidative wear of expanded graphite constituting the principal ingredient of the heat-resistant material is reduced even in a high-temperature range exceeding 700° C. by virtue of the oxidation suppressing action of the organic phosphorus compound, with the result that the heat resistance of the spherical annular seal member improves.

The outer layer includes a lubricating composition constituted of at least boron nitride and at least one of alumina and silica, and a reinforcing member constituted by a metal wire net integrated with the lubricating composition in mixed formed, and an outer surface of the partially convex spherical surface exposed to an outside in the outer layer is formed into a smooth lubricating sliding surface in which the lubricating composition and the reinforcing member are integrated in mixed form. Therefore, smooth sliding movement is effected in the sliding contact with a mating member.

As for the spherical annular seal member according to a third aspect of the invention, in the spherical annular seal member according to the second aspect, the lubricating composition contains 70-90 wt. % of boron nitride and 10-30 wt. % of at least one of alumina and silica.

In accordance with the spherical annular seal member according to the third aspect, the partially convex spherical outer surface in the outer layer of the lubricating composition containing 70-90 wt. % of boron nitride and 10-30 wt. % of at least one of alumina and silica is formed into a smooth surface in which the reinforcing member constituted by the metal wire net integrated with the lubricating composition in mixed form is exposed. Therefore, smooth sliding movement is effected particularly in the initial sliding movement with respect to the mating member, and the generation of abnormal noise in sliding friction which occasionally occurs in the initial period of sliding can be prevented.

As for the spherical annular seal member according to a fourth aspect of the invention, in the spherical annular seal member according to the second or third aspect, the lubricating composition further contains polytetrafluoroethylene resin.

As for the spherical annular seal member according to a fifth aspect of the invention, in the spherical annular seal member according to any one of the second to fourth aspects, the lubricating composition contains a mixture consisting of 70-90 wt. % of boron nitride and 10-30 wt. % of at least one of alumina and silica, and further contains not more than 200 parts by weight of polytetrafluoroethylene resin with respect to 100 parts by weight of the mixture.

As for the spherical annular seal member according to a sixth aspect of the invention, in the spherical annular seal member according to any one of the second to fourth aspects, the lubricating composition contains a mixture consisting of 70-90 wt. % of boron nitride and 10-30 wt. % of at least one of alumina and silica, and further contains 50 to 150 parts by weight of polytetrafluoroethylene resin with respect to 100 parts by weight of the mixture.

In accordance with the spherical annular seal member according to any one of the fourth, fifth, and sixth aspects, the partially convex spherical outer surface in the outer layer of the lubricating composition further containing polytetrafluoroethylene resin is formed into a smooth surface in which the reinforcing member constituted by the metal wire net integrated with the lubricating composition in mixed form is exposed. Therefore, smooth sliding movement is effected particularly in the initial sliding movement with respect to the mating member, and the generation of abnormal noise in sliding friction which occasionally occurs in the initial period of sliding can be prevented.

As for the spherical annular seal member according to a seventh aspect of the invention, in the spherical annular seal member according to any one of the first to sixth aspects, the heat-resistant material containing the expanded graphite and the organic phosphorus compound of the spherical annular base member is exposed on the cylindrical inner surface.

In accordance with the spherical annular seal member according to the seventh aspect, the oxidative wear of expanded graphite constituting the principal ingredient of the heat-resistant material in the cylindrical inner surface is reduced by virtue of the oxidation suppressing action of the organic phosphorus compound, with the result that the heat resistance of the spherical annular seal member improves. In addition, when the spherical annular seal member is fitted and fixed to the outer surface of the exhaust pipe, sealability between the cylindrical inner surface of the spherical annular seal member and the outer surface of the exhaust pipe is increased, so that leakage of exhaust gases from the contact surfaces can be prevented as practically as possible.

As for the spherical annular seal member according to an eighth aspect of the invention, in the spherical annular seal member according to any one of the first to seventh aspects, the reinforcing member constituted by the metal wire net of the spherical annular base member is exposed on the cylindrical inner surface.

In accordance with the spherical annular seal member according to the eighth aspect, when the spherical annular seal member is fitted and fixed to the outer surface of the exhaust pipe, friction between the cylindrical inner surface and the outer surface of the exhaust pipe is increased, with the result that the spherical annular seal member is firmly fixed to the outer surface of the exhaust pipe.

As for the spherical annular seal member according to a ninth aspect of the invention, in the spherical annular seal member according to any one of the first to eighth aspects, the heat-resistant material containing the expanded graphite and the organic phosphorus compound of the spherical annular base member is exposed on at least one of the annular end faces.

In accordance with the spherical annular seal member according to the ninth aspect, the oxidative wear of expanded graphite constituting the principal ingredient of the heat-resistant material in the annular end faces is reduced by virtue of the oxidation suppressing action of the organic phosphorus compound, with the result that the heat resistance of these annular end faces improves.

As for the spherical annular seal member according to a 10th aspect of the invention, in the spherical annular seal member according to any one of the first to ninth aspects, the heat-resistant material contains 0.1 to 10.0 wt. % of the organic phosphorus compound and 90.0 to 99.9 wt. % of the expanded graphite.

In accordance with the spherical annular seal member according to the 10th aspect, the heat-resistant material contains in a proportion of 0.1 to 10.0 wt. % the organic phosphorus compound necessary for favorably demonstrating the oxidation suppressing action with respect to the expanded graphite constituting the principal ingredient. Therefore, the oxidative wear of the expanded graphite is favorably reduced, and the weight loss of the spherical annular seal member ascribable to the oxidative wear of the expanded graphite is favorably reduced.

If the content of the organic phosphorus compound is less than 0.1 wt. %, the effect is not favorably exhibited on the oxidation suppressing action with respect to the expanded graphite. Meanwhile, if the organic phosphorus compound is contained in excess of 10.0 wt. %, any further effect on the oxidation suppressing action is not favorably exhibited. In addition, there is a possibility of impairing the flexibility of the expanded graphite sheet as the heat-resistant material, and the breakage or the like of the expanded graphite sheet occurs occasionally in the bending process or the like in the process of manufacturing the spherical annular seal member.

As in the spherical annular seal member according an 11th aspect of the invention, the organic phosphorus compound for favorably reducing the oxidative wear of the expanded graphite is selected from the group consisting of an organic phosphonic acid or an ester thereof, an organic phosphinic acid or an ester thereof, a phosphoric ester, a phosphorous ester, and a hypophosphorous ester.

As in the spherical annular seal member according a 12th aspect of the invention, the organic phosphonic acid or the ester thereof represented by the following general formula (1) is used:

wherein $R^1$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^2$ and $R^3$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

As in the spherical annular seal member according a 13th aspect of the invention, the organic phosphinic acid or the ester thereof represented by the following general formula (2) is used:

wherein $R^4$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^5$ and $R^6$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

As in the spherical annular seal member according a 14th aspect of the invention, the phosphoric ester represented by the following general formula (3) is used:

wherein each of $R^7$, $R^8$, and $R^9$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, providing that a case where all of them are hydrogen atoms is excluded.

As in the spherical annular seal member according a 15th aspect of the invention, the phosphorous ester is used by being selected from a phosphorous triester represented by the following general formula (4) and a phosphorous diester or a phosphorous monoester represented by the following general formula (5):

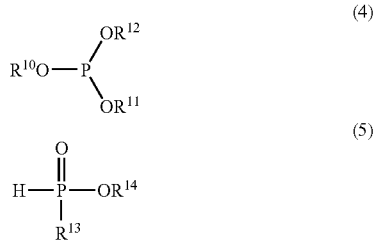

(4)

(5)

wherein each of $R^{10}$, $R^{11}$, and $R^{12}$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^{13}$ and $R^{14}$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, providing that a case where both of $R^{13}$ and $R^{14}$ are hydrogen atoms is excluded.

As in the spherical annular seal member according a 16th aspect of the invention, as the hypophosphorous ester, a hypophosphorous diester (phosphonite) represented by the following general formula (6) or a hypophosphorous monoester represented by the following general formula (7) is used:

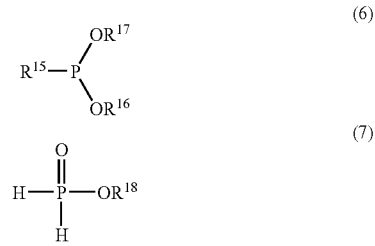

(6)

(7)

wherein $R^{15}$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^{16}$, $R^{17}$, and $R^{18}$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

In the spherical annular seal member in accordance with the invention, the spherical annular base member includes the reinforcing member made from a compressed metal wire net and the heat-resistant material filling meshes of the metal wire net of the reinforcing member, compressed in such a manner as to be formed integrally with the reinforcing member in mixed form, and containing expanded graphite and an organic phosphorus compound. Since the heat resistance of the seal member itself is increased, it is possible to suppress to a low level the rate of weight loss due to the oxidative wear of the expanded graphite making up the spherical annular seal member, and it is possible to sufficiently exhibit the function as the spherical annular seal member and improve the durability of the spherical annular seal member. In addition, since the heat-resistant sheet member containing the expanded graphite and the organic phosphorus compound has flexibility which the ordinary expanded graphite sheet has, no problem occurs in the bending process of the heat-resistant sheet member which is carried out in the process of manufacturing the spherical annular seal member. This makes it possible to not only eliminate the process of forming a coating of the heat-resistant material on the surface of the expanded graphite sheet in the conventional technique, but also prevent the fracture of the heat-resistant coating occurring in the bending process of the expanded graphite sheet having the heat-resistant coating and, hence, the breakage of the expanded graphite sheet, consequently leading to the improvement of the material yield.

Hereafter, a detailed description will be given of the present invention and its embodiments. It should be noted that the present invention is not limited to these embodiments.

BRIEF DESCRIPTION OF THE DRAWINGS

FIG. 1 is a vertical cross-sectional view illustrating a spherical annular seal member in accordance with the present invention;

FIG. 2 is a diagram explaining a method of forming a reinforcing member in a process of manufacturing the spherical annular seal member in accordance with the present invention;

BEST MODE FOR CARRYING OUT THE INVENTION

Figure 3:
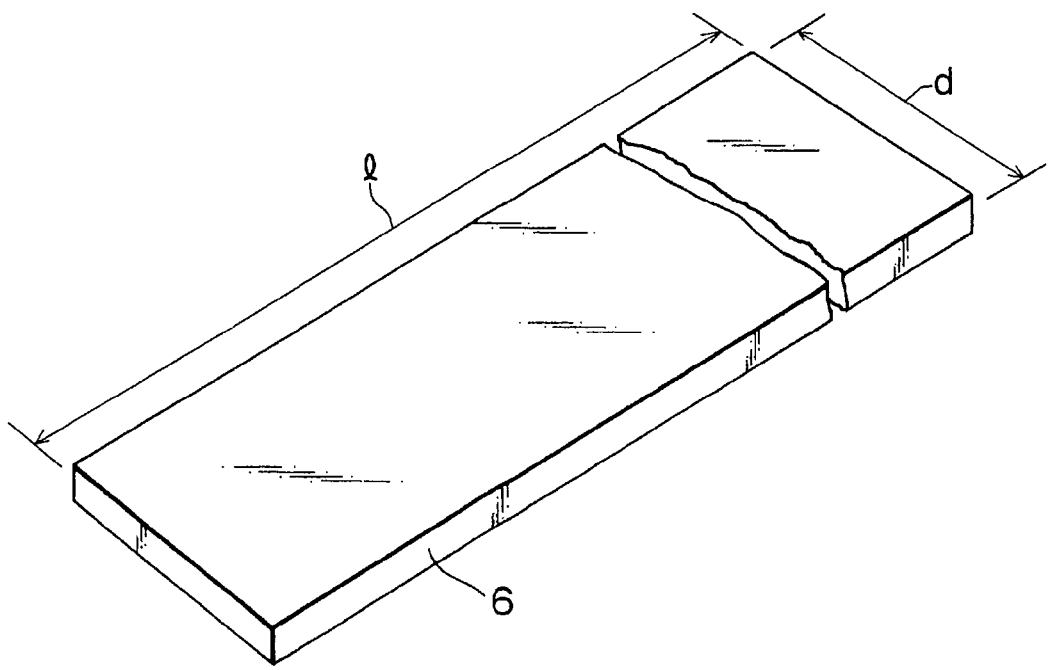
FIG. 3 is a perspective view of a heat-resistant sheet member in the process of manufacturing the spherical annular seal member in accordance with the present invention.
Figure 4:
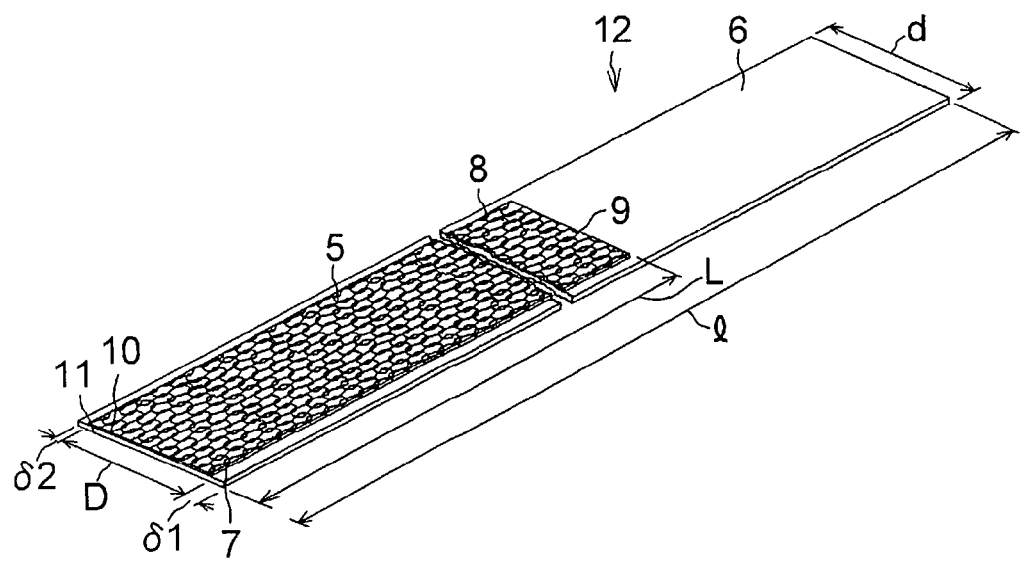
FIG. 4 is a perspective view of a superposed assembly in the process of manufacturing the spherical annular seal member in accordance with the present invention.

A description will be given of the constituent materials of a spherical annular seal member in accordance with the invention and a method of manufacturing the spherical annular seal member.

<Concerning Heat-Resistant Sheet Member>

<Manufacturing Method: I>

While 300 parts by weight of concentrated sulfuric acid of a 98% concentration is being agitated, 5 parts by weight of a 60% aqueous solution of hydrogen peroxide is added to it as an oxidizing agent, and this solution is used as a reaction solution. This reaction solution is cooled and kept at a temperature of 10° C., 100 parts by weight of natural flake graphite powder having a particle size of 30 to 80 meshes is added to it, and reaction is allowed to take place for 30 minutes. After the reaction, acid-treated graphite is separated by suction filtration, and a cleaning operation is repeated twice in which the acid-treated graphite is agitated in 300 parts by weight of water for 10 minutes and is then subjected to suction filtration, thereby sufficiently removing the sulfuric acid content from the acid-treated graphite. Then, the acid-treated graphite with the sulfuric acid content sufficiently removed is dried for 3 hours in a drying furnace held at a temperature of 110° C., and this acid-treated graphite is used as an acid-treated graphite material.

While the acid-treated graphite material is being agitated, the acid-treated graphite material is compounded with a powder or a solution of an organic phosphorus compound in a predetermined proportion of amount and is agitated uniformly to obtain a mixture. This mixture is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 200 to 300 times). These expanded graphite particles are fed to a twin roller apparatus and is subjected to roll forming, thereby fabricating a heat-resistant expanded graphite sheet having a desired thickness.

<Manufacturing Method: II>

An acid-treated graphite material is fabricated in the same way as in the above-described manufacturing method I. This acid-treated graphite material is subjected to heating (expansion) treatment for 1 to 10 seconds at temperatures of 950 to 1200° C. to produce cracked gas. The gaps between graphite layers are expanded by its gas pressure to form expanded graphite particles (expansion rate: 200 to 300 times). The expanded graphite particles thus obtained are compounded with a powder or a solution of an organic phosphorus compound in a predetermined proportion of amount and is agitated uniformly to obtain a mixture. This mixture is fed to a twin roller apparatus and is subjected to roll forming, thereby fabricating a heat-resistant expanded graphite sheet having a desired thickness.

The heat-resistant expanded graphite sheets fabricated in the above-described manufacturing methods I and II are flexible heat-resistant sheet members containing 0.1 to 10.0 wt. % of the organic phosphorus compound and 90.0 to 99.9 wt. % of expanded graphite.

The organic phosphorus compound dispersedly contained in the heat-resistant sheet member exhibits the action of suppressing the oxidative wear of expanded graphite in a high-temperature range exceeding 700° C. The content of the organic phosphorus compound is 0.1 to 10 wt. %, preferably 0.5 to 7.0 wt. %. The amount of the content of the organic phosphorus compound affects the flexibility of the heat-resistant sheet member, and if its content exceeds 10.0 wt. %, the heat-resistant sheet member shows the tendency of becoming hard and brittle. Therefore, the workability of the sheet member such as bending in the manufacturing method, which will be described later, is hampered.

The organic phosphorus compound is selected from the group consisting of an organic phosphonic acid or its ester, an organic phosphinic acid or its ester, a phosphoric ester, a phosphorous ester, a hypophosphorous ester, and the like.

As the organic phosphonic acid or its ester, an organic phosphonic acid or its ester which is represented by the following general formula (1) is suitably used:

In the above formula (1), $R^1$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^2$ and $R^3$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18.

The alkyl group is a straight-chain or branched-chain alkyl group (e.g., a methyl group, an ethyl group, a propyl group, an isopropyl group, an n-butyl group, a sec-butyl group, a tert-butyl group, or the like) preferably having a carbon number of 1 to 10, more preferably having a carbon number of 1 to 6. The aryl group is an aryl group (e.g., a phenyl group, a naphthyl group, an ethylphenyl group, a tolyl group, a xylyl group, or the like) preferably having a carbon number of 6 to 18, more preferably having a carbon number of 6 to 10. The aralkyl group is one (e.g., a benzyl group, a naphthylmethyl group, or the like) whose alkylene portion is straight-chain or branched-chain alkylene preferably having a carbon number of 1 to 10, more preferably having a carbon number of 1 to 6, and whose aryl portion is aryl preferably having a carbon number of 6 to 18, more preferably having a carbon number of 6 to 10.

As specific examples it is possible to cite methylphosphonic acid, ethylphosphonic acid, phenylphosphonic acid, tolylphosphonic acid, benzylphosphonic acid, methylphosphonic acid methyl ester, methylphosphonic acid dimethyl ester, methylphosphonic acid diphenyl ester, phenylphosphonic acid diethyl ester, and the like.

As the organic phosphinic acid or its ester, an organic phosphinic acid or its ester which is represented by the following general formula (2) is suitably used:

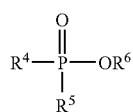

(2)

In the above formula (2), $R^4$ is an alkyl group or an aryl group, and each of $R^5$ and $R^6$ is a hydrogen atom, an alkyl group, or an aryl group. The alkyl group and the aryl group are the same as those described above.

As specific examples it is possible to cite methylphosphinic acid, ethylphosphinic acid, diethylphosphinic acid, methylethylphosphinic acid, phenylphosphinic acid, methylphenylphosphinic acid, diphenylphosphinic acid, methylphosphinic acid ethyl ester, dimethylphosphinic acid ethyl ester, methylphosphinic acid phenyl ester, phenylphosphinic acid ethyl ester, and the like.

As the phosphoric ester, a phosphoric ester which is represented by the following general formula (3) is suitably used:

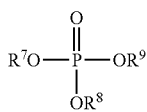

(3)

In the above formula (3), each of $R^7$, $R^8$, and $R^9$ is a hydrogen atom, an alkyl group, an aryl group, or an aralkyl group, providing that a case where all of them are hydrogen atoms is excluded. The alkyl group, the aryl group, and the aralkyl group are the same as those described above.

The alkyl group is a straight-chain or branched-chain alkyl group (e.g., a methyl group, an ethyl group, a propyl group, an isopropyl group, an n-butyl group, a sec-butyl group, a tert-butyl group, or the like) preferably having a carbon number of 1 to 10, more preferably having a carbon number of 1 to 6. The aryl group is an aryl group (e.g., a phenyl group, a naphthyl group, an ethylphenyl group, a tolyl group, a xylyl group, or the like) preferably having a carbon number of 6 to 18, more preferably having a carbon number of 6 to 10. The aralkyl group is one (e.g., a benzyl group, a naphthylmethyl group, or the like) whose alkylene portion is straight-chain or branched-chain alkylene preferably having a carbon number of 1 to 10, more preferably having a carbon number of 1 to 6, and whose aryl portion is aryl preferably having a carbon number of 6 to 18, more preferably having a carbon number of 6 to 10.

As specific examples it is possible to cite methyl phosphate, butyl phosphate, phenyl phosphate, diethyl phosphate, diphenyl phosphate, benzyl phosphate, trimethyl phosphate, triphenyl phosphate, diphenyl cresyl phosphate, methyl diphenyl phosphate, and the like.

As the phosphorous ester, a phosphorous triester which is represented by the following general formula (4) or a phosphorous diester or a phosphorous monoester which is represented by the following general formula (5) is suitably used:

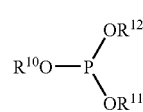

(4)

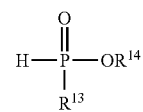

(5)

In the above formulae (4) and (5), each of $R^{10}$, $R^{11}$, and $R^{12}$ is an alkyl group, an aryl group, or an aralkyl group, and each of $R^{13}$ and $R^{14}$ is a hydrogen atom, an alkyl group, an aryl group, or an aralkyl group, providing that a case where both of $R^{13}$ and $R^{14}$ are hydrogen atoms is excluded.

The alkyl group, the aryl group, and the aralkyl group are the same as those described above. As specific examples it is possible to cite trimethyl phosphite, triphenyl phosphite, diethyl phosphite, diphenyl phosphite, butyl phosphite, phenyl phosphite, and the like.

As the hypophosphorous ester, a hypophosphorous diester (phosphonite) which is represented by the following general formula (6) or a hypophosphorous monoester which is represented by the following general formula (7) is suitably used:

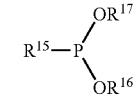

(6)

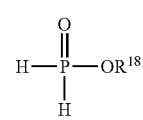

(7)

In the above formulae (6) and (7), $R^{15}$ is a hydrogen atom, an alkyl group, an aryl group, or an aralkyl group, and each of $R^{16}$, $R^{17}$, and $R^{18}$ is an alkyl group, an aryl group, or an aralkyl group.

The alkyl group, the aryl group, and the aralkyl group are the same as those described above. As specific examples it is possible to cite dimethyl phosphonite, diphenyl phosphonite, dibenzyl phosphonite, diethyl phosphonite, dimethyl phosphonite, methyl hypophosphite, ethyl hypophosphite, phenyl hypophosphite, and the like.

<Concerning Reinforcing Member>

As a reinforcing member, a metal wire net is used which is formed by weaving or knitting one or more wire members including, as an iron-based wire, a stainless steel wire made of such as austenitic stainless steels SUS 304 and SUS 316, a ferritic stainless steel SUS 430, or an iron wire (JIS-G-3532) or a galvanized iron wire (JIS-G-3547), or, as a copper wire, a wire member made of a copper-nickel alloy (cupro-nickel), a copper-nickel-zinc alloy (nickel silver), brass, or beryllium copper. As the wire diameter of the fine metal wire forming the metal wire net, a fine metal wire having a diameter of 0.10 to 0.32 mm or thereabouts is used, and a metal wire net whose meshes are 3 to 6 mm or thereabouts is suitably used.

As the reinforcing member, in addition to the above-described metal wire net, it is also possible to use a so-called expanded metal in which a stainless steel sheet or a phosphor bronze sheet is slotted and the slots are expanded to form rows of regular meshes. The thickness of the stainless steel sheet or the phosphor bronze sheet is 0.3 to 0.5 mm or thereabouts, and an expanded metal whose meshes are 3 to 6 mm or thereabouts is suitably used.

<Concerning Lubricating Composition>

An aqueous dispersion containing as a solid content 20 to 50 wt. % of a lubricating composition consisting of 70 to 90 wt. % of boron nitride and 10 to 30 wt. % of at least one of alumina and silica is used. As an alternative lubricating composition, an aqueous dispersion is used which contains as a solid content 20 to 50 wt. % of a lubricating composition obtained by allowing a lubricating composition consisting of 70 to 90 wt. % of boron nitride and 10 to 30 wt. % of at least one of alumina and silica to contain not more than 200 parts by weight, preferably 50 to 150 parts by weight, of polytetrafluoroethylene resin with respect to 100 parts by weight of that lubricating composition.

The above-described aqueous dispersion of the lubricating composition is applied to the surface of the heat-resistant sheet member by means of brushing, roller coating, spraying, or the like in the manufacturing method which will be described later, and is used so as to form a lubricating sliding layer on the surface of the heat-resistant sheet by coating the surface of the heat-resistant sheet. In a final compression process, the lubricating sliding layer thus formed is spread into a uniform and very small thickness (10 to 300 µm) to form an outer surface layer on the partially convex spherical outer surface and its vicinities of the spherical annular seal member.

Boron nitride among the aforementioned lubricating compositions demonstrates excellent lubricity particularly at high temperatures. However, boron nitride as a single constituent is inferior in its adhesion onto the surface of the heat-resistant sheet and, hence, in its adhesion onto the partially convex spherical outer surface of the spherical annular base member in the final compression process. Consequently, boron nitride as a single constituent has a drawback in that it is easily exfoliated from these surfaces. However, by compounding at least one of alumina and silica with boron nitride at a fixed ratio, it is possible to avoid the aforementioned drawback of boron nitride, substantially improve its adhesion onto the surface of the heat-resistant sheet and, hence, onto the partially convex spherical surface of the spherical annular base member in the final compression process, and enhance the retention of the partially convex spherical outer surface and constituting the lubricating sliding surface formed of the lubricating composition in the outer layer of the spherical annular seal member. The proportion in which at least one of alumina and silica is compounded with respect to boron nitride is determined from the viewpoint of improving adhesion without impairing the lubricity of boron nitride, and a range of 10 to 30 wt. % is therefore preferable.

In the aforementioned lubricating composition which contains the lubricating composition consisting of 70 to 90 wt. % of boron nitride and 10 to 30 wt. % of at least one of alumina and silica, and further contains polytetrafluoroethylene resin at a fixed ratio with respect to 100 parts by weight of this lubricating composition, polytetrafluoroethylene resin itself has a low frictional property, and as it is compounded with the lubricating composition formed of boron nitride and at least one of alumina and silica, polytetrafluoroethylene resin exhibits the action of improving the low frictional property of the lubricating composition and the action of enhancing the ductility of the lubricating composition during compression forming.

The proportion in which polytetrafluoroethylene resin is compounded with respect to 100 parts by weight of the lubricating composition of 70 to 90 wt. % of boron nitride and 10 to 30 wt. % of at least one of alumina and silica is not more than 200 parts by weight, preferably in the range of 50 to 150 parts by weight. If the compounding proportion of polytetrafluoroethylene resin exceeds 200 parts by weight, the proportion of the resin in the lubricating composition becomes large, thereby resulting in a decline in the heat resistance of the lubricating composition. If the compounding proportion of polytetrafluoroethylene resin is in the range of 50 to 150 parts by weight, the low frictional property can be demonstrated most satisfactorily without impairing the heat resistance of the lubricating composition. As this polytetrafluoroethylene resin, an aqueous dispersion dispersedly containing as a solid content 30 to 50 wt. % of a fine powder with an average particle size of 10 µm or less.

Next, referring to the drawings, a description will be given of the method of manufacturing the spherical annular seal member composed of the above-described constituent materials.

<Manufacturing Method in Accordance with First Embodiment>

(First Process) As shown in FIG. 2, a tubular metal wire net 1 formed by knitting fine metal wires into a cylindrical shape is passed between rollers 2 and 3, thereby fabricating a belt-shaped metal wire net 4 having a predetermined width D. A reinforcing member 5 obtained by cutting the belt-shaped metal wire net 4 into a predetermined length L, or a reinforcing member 5 obtained by cutting a belt-shaped metal wire net 4, which is formed directly by knitting or the like, into the predetermined width D and length L, is prepared.

(Second Process) As shown in FIG. 3, a heat-resistant sheet member 6 is prepared which contains 0.1 to 10.0 wt. % of the organic phosphorus compound and 90.0 to 99.9 wt. % of expanded graphite and has been cut so as to have a width d of 1.1×D to 2.1×D with respect to the width D of the reinforcing member 5 and a length l of 1.30×L to 2.70×L with respect to the length L of the reinforcing member 5.

(Third Process) A superposed assembly 12 in which the reinforcing member 5 and the heat-resistant sheet member 6 are superposed one on top of the other is prepared as follows: To ensure that the heat-resistant material is wholly exposed on at least one axial end side of a partially convex spherical surface 53 in a spherical annular seal member 58, which will be described later (see FIG. 1), i.e., on a large-diameter-side end face 54 which is an annular end face, the heat-resistant sheet member 6 is made to project in the widthwise direction by a maximum of 0.1×D to 0.8×D from at least one widthwise end 7 of the reinforcing member 5, which becomes the large-diameter-side end face 54 of the partially convex spherical surface 53. Also, the amount of widthwise projection, δ1, of the heat-resistant sheet member 6 from the end 7 becomes greater than the amount of its widthwise projection, δ2, from the other widthwise end 8 of the reinforcing member 5, which becomes a small-diameter side annular end face 55 of the partially convex spherical surface 53. Also, the heat-resistant sheet member 6 is made to project in the longitudinal direction by a maximum of 0.30×L to 1.70×L from at one longitudinal end 9 of the reinforcing member 5. Also, the other longitudinal end 10 of the reinforcing member 5 and a longitudinal end 11 of the heat-resistant sheet member 6 corresponding to that end 10 are made to substantially agree with each other. The reinforcing member 5 and the heat-resistant sheet member 6 are thus matched in the widthwise direction and the longitudinal direction.

Figure 5:
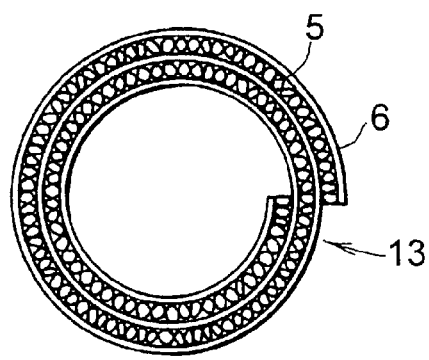
FIG. 5 is a plan view illustrating a tubular base member in the process of manufacturing the spherical annular seal member in accordance with the present invention.
Figure 6:
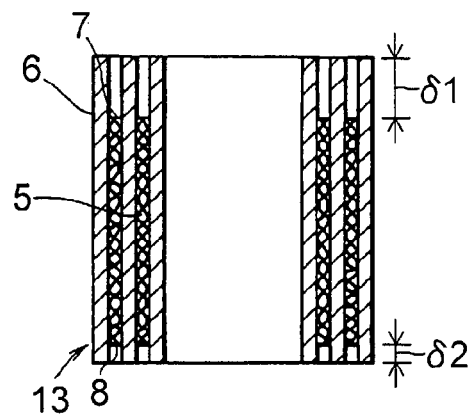
FIG. 6 is a vertical cross-sectional view of the tubular base member shown in FIG. 5.

(Fourth Process) As shown in FIG. 5, the superposed assembly 12 is convoluted with the heat-resistant sheet member 6 placed on the inner side such that heat-resistant sheet member 6 is convoluted with one more turn, thereby forming a tubular base member 13 in which the heat-resistant sheet member 6 is exposed on both the inner peripheral side and the outer peripheral side. As the heat-resistant sheet member 6, one is prepared in advance which has a length l of 1.30×L to 2.70×L with respect to the length L of the reinforcing member 5 so that the number of winding turns of the heat-resistant sheet member 6 in the tubular base member 13 becomes greater than the number of winding turns of the reinforcing member 5. In the tubular base member 13, as shown in FIG. 6, the heat-resistant sheet member 6 on its one widthwise end side projects in the widthwise direction by δ1 from the one end 7 of the reinforcing member 5, and the heat-resistant sheet member 6 on its other widthwise end side projects in the widthwise direction by δ2 from the other end 8 of the reinforcing member 5.

Figure 7:
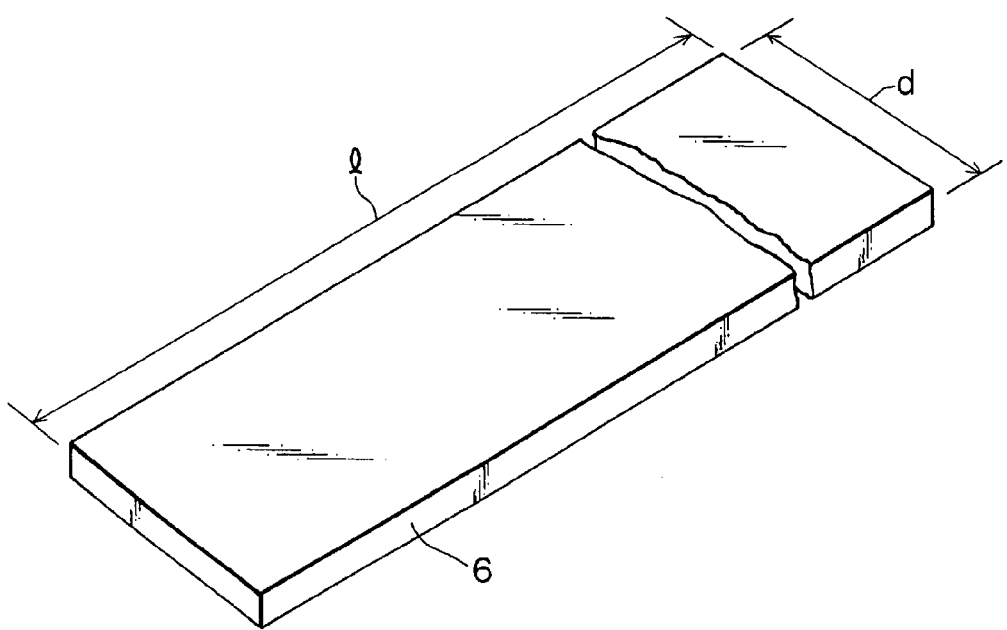
FIG. 7 is a perspective view of a heat-resistant sheet member in the process of manufacturing the spherical annular seal member in accordance with the present invention.
Figure 8:
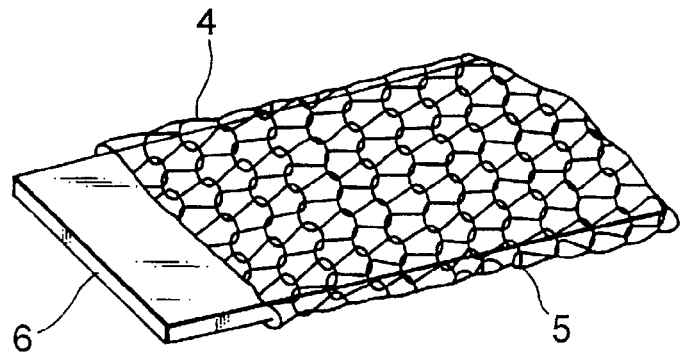
FIG. 8 is a diagram explaining a method of forming an outer-surface-layer forming member in the process of manufacturing the spherical annular seal member in accordance with the present invention.
Figure 9:
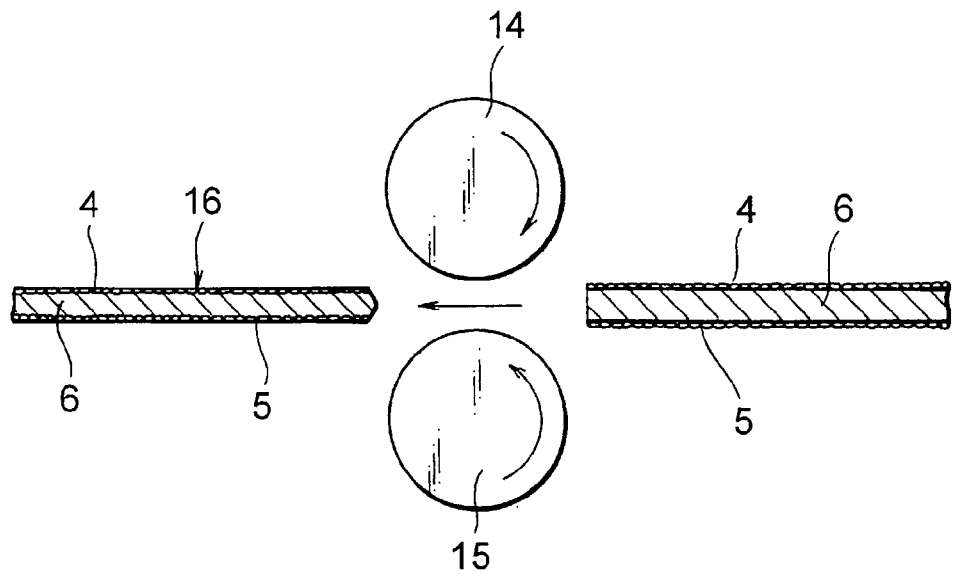
FIG. 9 is a diagram explaining a method of forming the outer-surface-layer forming member in the process of manufacturing the spherical annular seal member in accordance with the present invention.

(Fifth Process) Another heat-resistant sheet member 6, which is similar to the above-described heat-resistant sheet member 6 but has a smaller width d than the width D and a length l of such a measure as to be capable of being wound around the tubular base member 13 by one turn, is prepared separately, as shown in FIG. 7. Meanwhile, as described in the above-described first process, after the fine metal wires are woven to form the cylindrical metal wire net 1, another reinforcing member 5 constituted by the belt-shaped metal wire net 4, which is fabricated by allowing the cylindrical metal wire net 1 to be passed between the rollers 3 and 4, is prepared separately. Subsequently, as shown in FIG. 8, the heat-resistant sheet member 6 is inserted into the belt-shaped metal wire net 4, and, as shown in FIG. 9, an assembly thereof is passed between rollers 14 and 15 so as to be formed integrally, thereby preparing an outer-surface-layer forming member 16.

Figure 10:
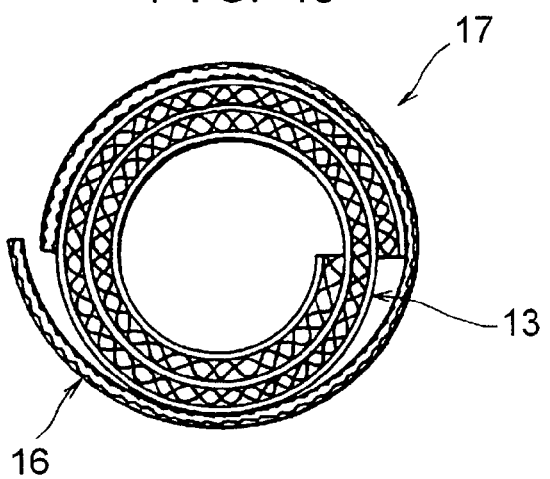
FIG. 10 is a plan view illustrating a cylindrical preform in the process of manufacturing the spherical annular seal member in accordance with the present invention.

(Sixth Process) The outer-surface-layer forming member 16 thus obtained is wound around an outer peripheral surface of the aforementioned tubular base member 13, thereby preparing a cylindrical preform 17, as shown in FIG. 10.

Figure 11:
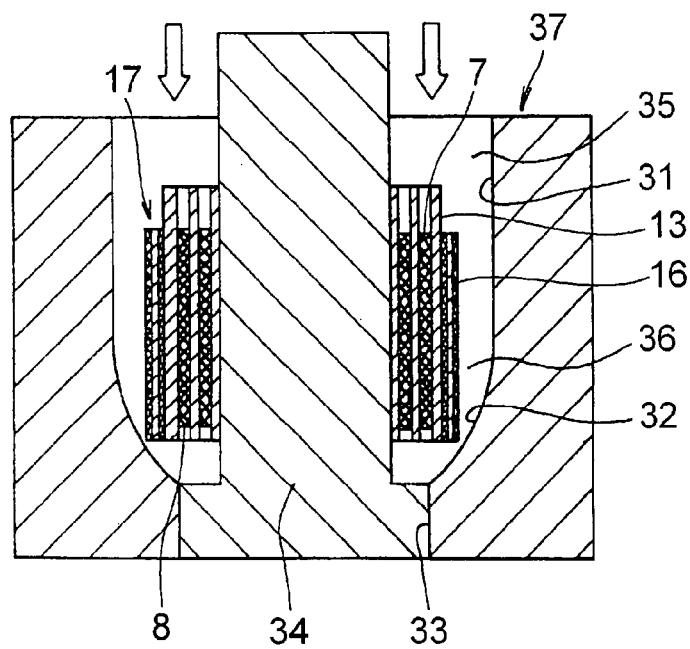
FIG. 11 is a vertical cross-sectional view illustrating a state in which the cylindrical preform is inserted in a die in the process of manufacturing the spherical annular seal member in accordance with the present invention.

(Seventh Process) As shown in FIG. 11, a die 37 is prepared which has a cylindrical inner wall surface 31, a partially concave spherical inner wall surface 32 continuing from the cylindrical inner wall surface 31, and a through hole 33 continuing from the partially concave spherical inner wall surface 32, and in which a hollow cylindrical portion 35 and a spherical annular hollow portion 36 continuing from the hollow cylindrical portion 35 are formed inside it as a stepped core 34 is inserted in the through hole 33. Then, the cylindrical preform 17 is fitted over the stepped core 34 of the die 37.

The cylindrical preform 17 located in the hollow cylindrical portion 35 and the spherical annular hollow portion 36 of the die 37 is subjected to compression forming under a pressure of 1 to 3 tons/cm$^2$ in the direction of the core axis. Thus, the spherical annular seal member 58 is fabricated which includes a spherical annular base member 56 having a through hole 51 in its central portion and defined by a cylindrical inner surface 52, the partially convex spherical surface 53, and the large-and small-diameter-side annular end faces 54 and 55 of the partially convex spherical surface 53, as well as an outer surface 57 formed integrally on the partially convex spherical surface 53 of the spherical annular base member 56, as shown in FIG. 1.

By means of this compression forming, the spherical annular base member 56 is constructed so as to be provided with structural integrity as the heat-resistant sheet member 6 and the reinforcing member 5 constituted by the metal wire net 4 are compressed and intertwined with each other. The spherical annular base member 56 has the reinforcing member 5 constituted by the compressed metal wire net 4, as well as the heat-resistant material filling the meshes of the metal wire net 4 of this reinforcing member 5, compressed in such a manner as to be formed integrally with this reinforcing member 5 in mixed form, and containing expanded graphite and the organic phosphorus compound. The outer layer 57 has the heat-resistant material constituted by the compressed heat-resistant sheet member 6 and the reinforcing member 5 constituted by the metal wire net 4 formed integrally with this heat-resistant material in mixed form. A partially convex spherical outer surface 59 exposed to the outside in the outer layer 57 is formed into a smooth surface, and the heat-resistant material composed of expanded graphite and the organic phosphorus compound is exposed in the cylindrical inner surface 52.

In the spherical annular seal member fabricated by the above-described method and shown in FIG. 1, the heat-resistant material constituted by the heat-resistant sheet member 6 is intertwined and formed integrally with the reinforcing member 5 constituted by the metal wire net 4 which forms an internal structure, while the partially convex spherical outer surface 59 is formed into a smooth surface in which the heat-resistant material formed by the outer-surface-layer forming member 16 and composed of expanded graphite and the organic phosphorus compound, as well as the reinforcing member 5 constituted by the metal wire net 4, are integrated in mixed form. At the same time, at the large-diameter-side annular end face 54 and the small-diameter-side end face 55 of the partially convex spherical surface 53, the heat-resistant sheet member 6 projecting in the widthwise direction of the reinforcing member 5 is bent and extended, and the heat-resistant material composed of expanded graphite and the organic phosphorus compound is thereby exposed.

It should be noted that, in the above-described second process, the heat-resistant sheet member 6 cut to have a substantially identical length l with respect to the length L of the reinforcing member 5 is prepared. These members are superposed one on top of the other in the same way as in the above-described third process to obtain the superposed assembly 12. This superposed assembly 12 is formed into the tubular base member 13 with the reinforcing member 5 placed on the inner side in the same way as in the above-described fourth process. Thereafter, the spherical annular seal member 58 is fabricated through the fifth process to the seventh process, and the spherical annular seal member 58 is thereby formed in which the reinforcing member 5 constituted by the metal wire net 4 of the spherical annular base member 56 is exposed on the cylindrical inner surface 52 in the through hole 51.

<Manufacturing Method in Accordance with Second Embodiment>

The first to fourth processes are identical to those of the above-described first to fourth processes.

Figure 12:
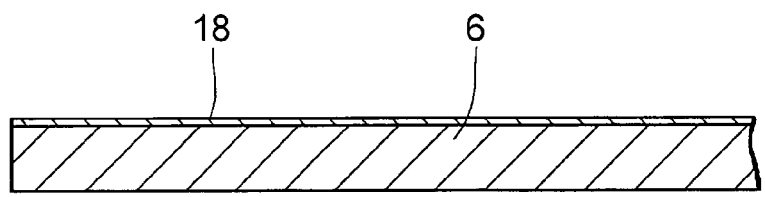
FIG. 12 is a vertical cross-sectional view of the heat-resistant sheet member forming a lubricating sliding layer in the process of manufacturing the spherical annular seal member in accordance with the present invention.

(Fifth Process) Another heat-resistant sheet member 6 (see FIG. 7), which is similar to the above-described heat-resistant sheet member 6 but has a smaller width d than the width D and a length l of such a measure as to be capable of being wound around the tubular base member 13 by one turn, is prepared separately. An aqueous dispersion containing as a solid content 20 to 50 wt. % of a lubricating composition constituted of 70 to 90 wt. % of boron nitride and 10 to 30 wt. % of at least one of alumina and silica, or an aqueous dispersion which contains as a solid content 20 to 50 wt. % of a lubricating composition obtained by allowing a lubricating composition consisting of 70 to 90 wt. % of boron nitride and 10 to 30 wt. % of at least one of alumina and silica to contain not more than 200 parts by weight, preferably 50 to 150 parts by weight, of polytetrafluoroethylene resin with respect to 100 parts by weight of that lubricating composition, is coated on one surface of the heat-resistant sheet member 6 by means of brushing, roller coating, spraying, or the like. This coating is then dried to form a lubricating sliding layer 18 which is formed of the lubricating composition, as shown in FIG. 12.

Figure 13:
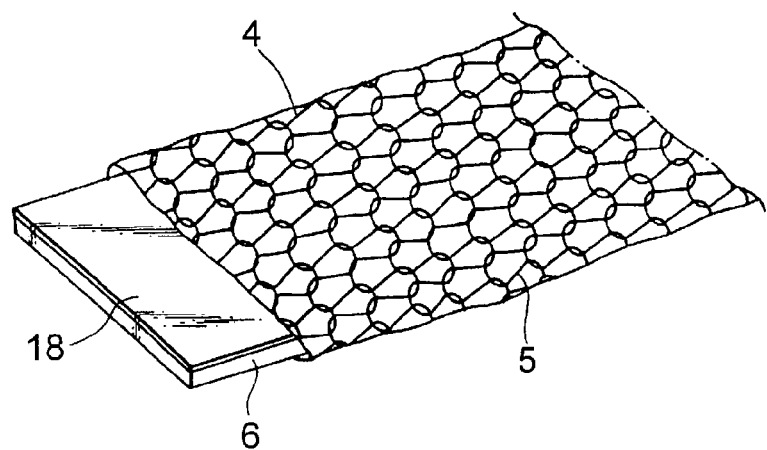
FIG. 13 is a diagram explaining a method of forming the outer-surface-layer forming member in the process of manufacturing the spherical annular seal member in accordance with the present invention.
Figure 14:
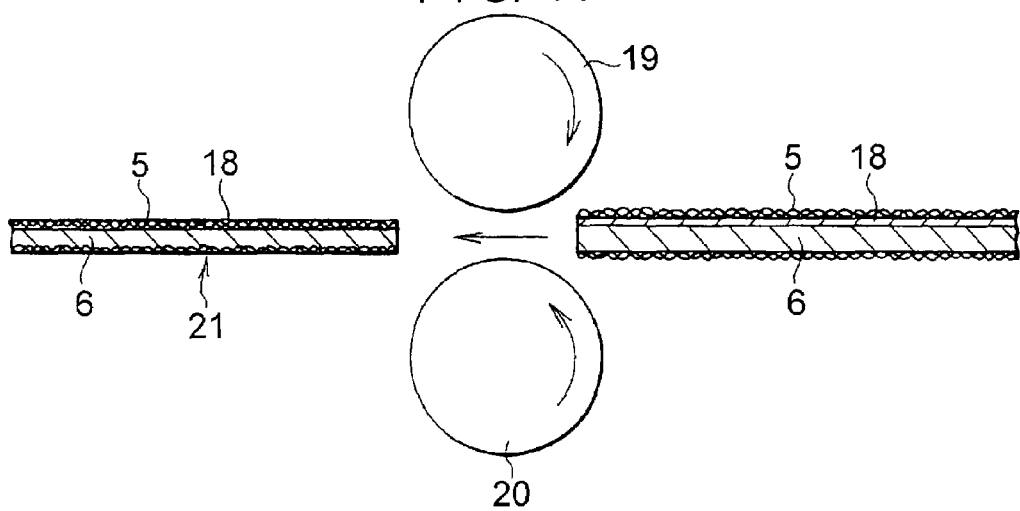
FIG. 14 is a diagram explaining a method of forming the outer-surface-layer forming member in the process of manufacturing the spherical annular seal member in accordance with the present invention.

The reinforcing member 5 constituted by the belt-shaped metal wire net 4, which has been described in the above-described third process, is prepared separately. Subsequently, as shown in FIG. 13, the heat-resistant sheet member 6 having the lubricating sliding layer 18 is inserted into the belt-shaped metal wire net 4, and, as shown in FIG. 14, an assembly thereof is passed between rollers 19 and 20 so as to be formed integrally, thereby preparing an outer-surface-layer forming member 15.

Figure 15:
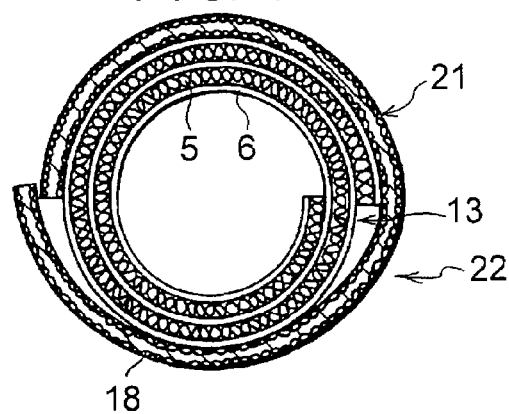
FIG. 15 is a plan view illustrating the cylindrical preform in the process of manufacturing the spherical annular seal member in accordance with the present invention.
Figure 16:
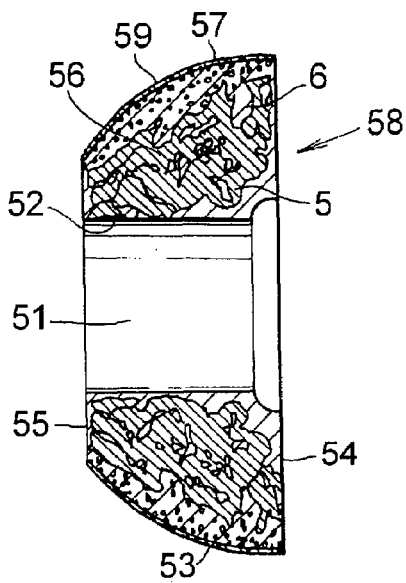
FIG. 16 is a vertical cross-sectional view illustrating a spherical annular seal member in accordance with the present invention.
Figure 17:
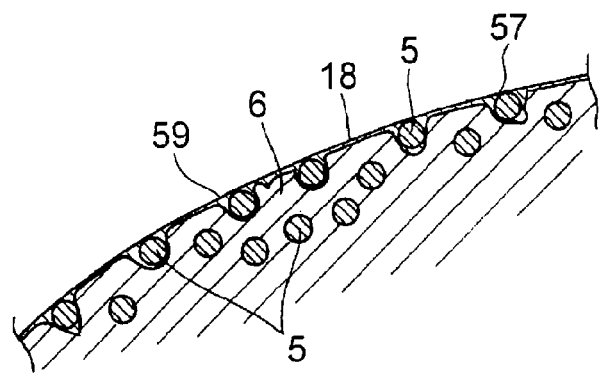
FIG. 17 is a partially enlarged cross-sectional view illustrating the outer surface, formed in the shape of the partially convex spherical surface, of the spherical annular seal member shown in FIG. 1.

(Sixth Process) The outer-surface-layer forming member 21 thus obtained is wound around the outer peripheral surface of the aforementioned tubular base member 13 with the lubricating sliding layer 18 placed on the outer side, thereby preparing a cylindrical preform 22, as shown in FIG. 15. This cylindrical preform 22 is subjected to compression forming in a method similar to that of the above-described seventh process. Thus, the spherical annular seal member 58 is fabricated which includes the spherical annular base member 56 having the through hole 51 in its central portion and defined by the cylindrical inner surface 52, the partially convex spherical surface 53, and the large-and small-diameter-side annular end faces 54 and 55 of the partially convex spherical surface 53, as well as an outer surface 57 formed integrally on the partially convex spherical surface 53 of the spherical annular base member 56, as shown in FIGS. 16 and 17. By means of this compression forming, the spherical annular base member 56 is constructed so as to be provided with structural integrity as the heat-resistant sheet member 6 and the reinforcing member 5 constituted by the metal wire net 4 are compressed and intertwined with each other. The spherical annular base member 56 has the reinforcing member 5 constituted by the compressed metal wire net 4, as well as the heat-resistant material filling the meshes of the metal wire net 4 of this reinforcing member 5, compressed in such a manner as to be formed integrally with this reinforcing member 5 in mixed form, and containing expanded graphite. The outer layer 57 is constructed so as to be provided with structural integrity as the lubricating sliding layer 18 and the reinforcing member 5 constituted by the metal wire net 4 integrated with that lubricating sliding layer 18 are compressed and intertwined with each other. The outer layer 57 has a lubricating composition in which a lubricating composition constituted of 70 to 90 wt. % of boron nitride and 10 to 30 wt. % of at least one of alumina and silica, or a lubricating composition consisting of 70 to 90 wt. % of boron nitride and 10 to 30 wt. % of at least one of alumina and silica, contains not more than 200 parts by weight, preferably 50 to 150 parts by weight, of polytetrafluoroethylene resin with respect to 100 parts by weight of that lubricating composition, as well as the reinforcing member constituted by the metal wire net integrated with this lubricating composition in mixed form. The partially convex spherical outer surface 59 exposed to the outside in the outer layer 57 is formed into a smooth surface in which the aforementioned lubricating composition and the reinforcing member are integrated in mixed form. The cylindrical inner surface 52 defining the through hole 51 is formed as a surface in which the compressed heat-resistant sheet member 6 is exposed, with the result that the heat-resistant material composed of expanded graphite and the organic phosphorus compound in the spherical annular base member 56 is exposed. At the large-diameter-side annular end face 54 and the small-diameter-side end face 55 of the partially convex spherical surface 53, the heat-resistant sheet member 6 projecting in the widthwise direction of the reinforcing member 5 is bent and extended, and the heat-resistant material composed of expanded graphite and the organic phosphorus compound is thereby exposed.

In the above-described second manufacturing method as well, in the second process, the heat-resistant sheet member 6 having a substantially identical length l with respect to the length L of the reinforcing member 5 is prepared. These members are superposed one on top of the other in the same way as described above to obtain the superposed assembly 12. This superposed assembly 12 is formed into the tubular base member 13 with the reinforcing member 5 placed on the inner side in the same way as described above. The spherical annular seal member 58 is formed from this tubular base member 13, and the spherical annular seal member 58 is thereby formed in which the reinforcing member 5 constituted by the metal wire net 4 of the spherical annular base member 56 is exposed on the cylindrical inner surface 52 in the through hole 51.

Figure 18:
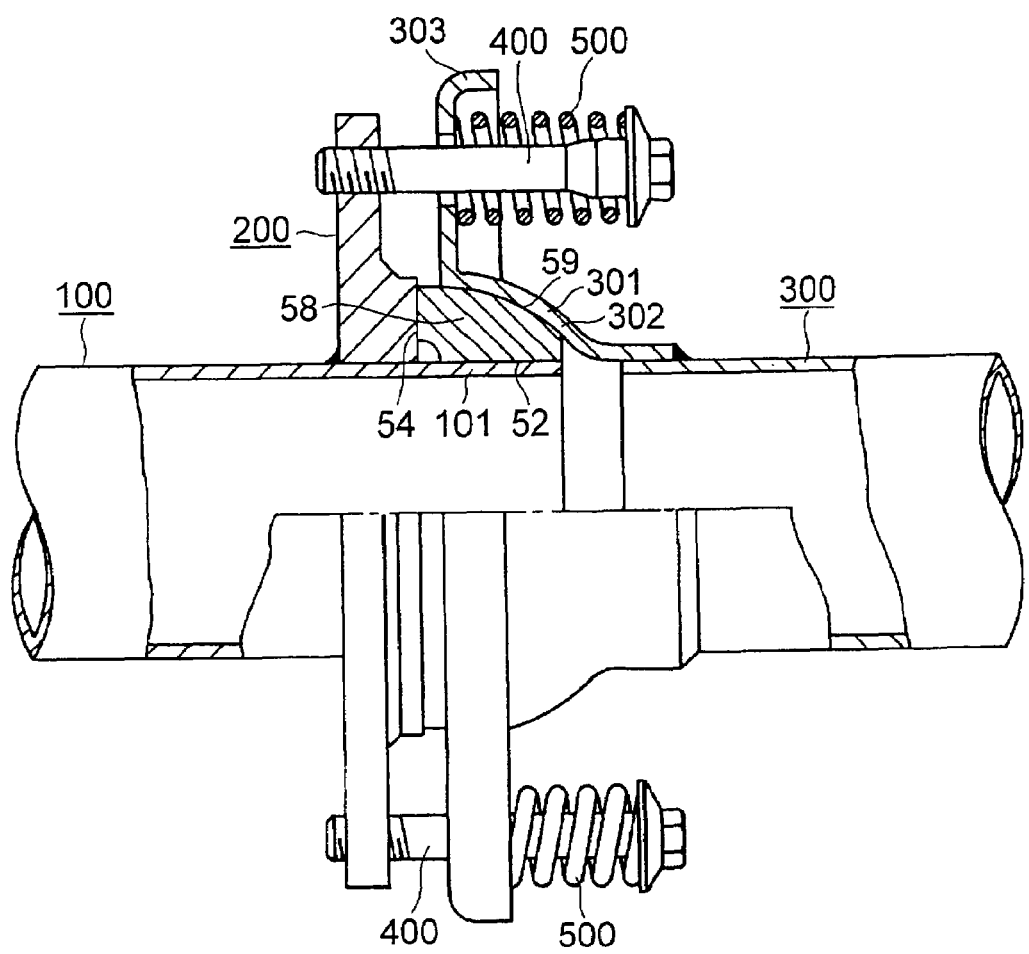
FIG. 18 is a vertical cross-sectional view of an exhaust pipe spherical joint in which the spherical annular seal member in accordance with the present invention has been incorporated.

The spherical annular seal member 58 is used by being incorporated in the exhaust pipe spherical joint shown in FIG. 18, for example. That is, a flange 200 is provided uprightly on an outer peripheral surface of an upstream-side exhaust pipe 100, which is connected to an engine, by leaving a pipe end 101. The spherical annular seal member 58 is fitted over the pipe end 101 at the cylindrical inner surface 52 defining the through hole 51, and is seated with its large-diameter-side end face 54 abutting against that flange 200. A downstream-side exhaust pipe 300 opposes at one end the upstream-side exhaust pipe 100 and is connected at the other end to a muffler. A flared portion 301, which is comprised of a concave spherical surface portion 302 and a flange portion 303 provided at a rim of an opening portion of the concave spherical surface portion 302, is formed integrally at one end of the downstream-side exhaust pipe 300. The exhaust pipe 300 is disposed with the concave spherical surface portion 302 slidingly abutting against the partially convex spherical outer surface 59 of the spherical annular seal member 58.

In the exhaust pipe spherical joint shown in FIG. 18, the downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303. The exhaust pipe spherical joint is arranged such that relative angular displacements occurring in the upstream-and downstream-side exhaust pipes 100 and 300 are allowed by sliding contact between the partially convex spherical outer surface 59 of the spherical annular seal member 58 and the concave spherical surface portion 302 of the flared portion 301 formed at the end of the downstream-side exhaust pipe 300.

Next, the present invention will be described in detail in accordance with examples. It should be noted that the present invention is not limited to these examples.

EXAMPLES

Examples 1 to 8

While 300 parts by weight of concentrated sulfuric acid with a concentration of 98% was being agitated, 5 parts by weight of a 60% aqueous solution of hydrogen peroxide was added as an oxidizer, and this was used as a reaction liquid. This reaction liquid was cooled and held at a temperature of 10° C., 100 parts by weight of a scaly natural graphite powder with a particle size of 30 to 80 meshes was added to this reaction liquid, and reaction was allowed to take place for 30 minutes. After the reaction, the acid-treated graphite was separated by suction and filtration, and a cleaning operation in which the acid-treated graphite was agitated in 300 parts by weight of water for 10 minutes and was sucked and filtered was repeated two times, thereby sufficiently removing the sulfuric acid content from the acid-treated graphite. Next, the acid-treated graphite from which the sulfuric acid content was removed sufficiently was dried for three hours in a drying furnace held at a temperature of 110° C., and this was used as the acid-treated graphite material.

While 100 parts by weight of the acid-treated graphite material was being agitated, the acid-treated graphite material was compounded with (1) 0.1 parts by weight, (2) 0.5 parts by weight, (3) 1.0 parts by weight, (4) 2.0 parts by weight, (5) 4.2 parts by weight, (6) 6.4 parts by weight, (7) 8.7 parts by weight, and (8) 11.1 parts by weight, respectively, of a powder of phenylphosphonic acid as the organic phosphorus compound, and was agitated uniformly, thereby obtaining 8 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the phenylphosphonic acid among the components was dispersedly contained in the expanded graphite particles. These expanded graphite particles were subjected to roll forming by being passed through a reduction roll, thereby fabricating expanded graphite sheets having a thickness of 0.38 mm. These sheets were used as the heat-resistant sheet members 6. These heat-resistant sheet members 6 respectively contained (1) 0.1% by weight of phenylphosphonic acid and 99.9% by weight of expanded graphite, (2) 0.5% by weight of phenylphosphonic acid and 99.5% by weight of expanded graphite, (3) 1.0% by weight of phenylphosphonic acid and 99.0% by weight of expanded graphite, (4) 2.0% by weight of phenylphosphonic acid and 98.0% by weight of expanded graphite, (5) 4.0% by weight of phenylphosphonic acid and 96.0% by weight of expanded graphite, (6) 6.0% by weight of phenylphosphonic acid and 94.0% by weight of expanded graphite, (7) 8.0% by weight of phenylphosphonic acid and 92.0% by weight of expanded graphite, and (8) 10.0% by weight of phenylphosphonic acid and 90.0% by weight of expanded graphite.

The heat-resistant sheet members 6 thus fabricated and constituted of the above-described component compositions (1) to (8) were respectively cut into a width of 52 mm and a length of 655 mm.

By using two austenitic stainless steel wires (SUS 304) having a wire diameter of 0.28 mm as fine metal wires, a cylindrical woven metal wire net whose meshes were 4.0 mm was fabricated and was passed between the rollers 2 and 3 to form the belt-shaped metal wire net 4 with a width of 35 mm and a length of 320 mm. This metal wire net 4 was used as the reinforcing member 5.

After each of the aforementioned heat-resistant sheet members 6 cut into the width of 52 mm and the length of 655 mm was convoluted around the outer peripheral surface of the core with a diameter of 45 mm by a one-circumference portion, the reinforcing member 5 was superposed on the inner side of the heat-resistant sheet member 6, and the superposed assembly thereof was convoluted, thereby preparing the tubular base member 13 in which the heat-resistant sheet member 6 was exposed on the outermost periphery. In this tubular base member 13, widthwise opposite end portions of the heat-resistant sheet member 6 respectively projected from the reinforcing member 5 in the widthwise direction.

Heat-resistant sheet members 6 having the above-described component compositions (1) to (8) were prepared separately, and they were respectively cut into a width of 48 mm and a length of 193 mm.

By using a fine metal wire similar to the one described above, each cylindrical woven metal wire net whose meshes were 4.0 mm was formed, and was passed between the pair of rollers 2 and 3, thereby fabricating the belt-shaped metal wire net 4 with a width of 52.0 mm and a length of 193 mm. Each of the heat-resistant sheet members 6 was inserted into each belt-shaped metal wire net 4, and an assembly thereof was passed between the pair of rollers 14 and 15 so as to be formed integrally, thereby fabricating the outer-surface-layer forming member 16 in which the reinforcing member 5 and the heat-resistant sheet member 6 filling the meshes of the reinforcing member 5 and containing phenylphosphonic acid and expanded graphite were present in mixed form.

This outer-surface-layer forming member 16 was wound around the outer peripheral surface of the aforementioned tubular base member 13, thereby preparing the cylindrical preform 17. This cylindrical preform 17 was fitted over the stepped core 34 of the die 37, and was placed in the spherical annular hollow portion 36 of the die 37 in which the radius of curvature of the partially concave spherical inner wall surface 32 was 24.5 mm.

The cylindrical preform 17 located in the spherical annular hollow portion 36 of the die 37 was subjected to compression forming under a pressure of 2 tons/cm$^2$ in the direction of the core axis. Thus, the spherical annular seal member 58 was fabricated which included the spherical annular base member 56 having the through hole 51 in its central portion and defined by the cylindrical inner surface 52, the partially convex spherical surface 53, and the large-and small-diameter-side annular end faces 54 and 55 of the partially convex spherical surface 53, as well as the outer surface 57 formed integrally on the partially convex spherical surface 53 of the spherical annular base member 56. By means of this compression forming, the spherical annular base member 56 was constructed so as to be provided with structural integrity as the heat-resistant sheet member 6 containing phenylphosphonic acid and expanded graphite and the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the heat-resistant material constituted by the heat-resistant sheet member 6 containing phenylphosphonic acid and expanded graphite, as well as the reinforcing member 5 constituted by the metal wire net 4 integrated with this heat-resistant material, were compressed and intertwined with each other. The partially convex spherical outer surface 59 exposed to the outside in the outer layer 57 was formed into a smooth surface in which the heat-resistant material containing phenylphosphonic acid and expanded graphite and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Examples 9 to 12

The acid-treated graphite material was fabricated in the same way as in the above-described Examples. While 100 parts by weight of the acid-treated graphite material was being agitated, the acid-treated graphite material was compounded with (9) 1.0 parts by weight, (10) 2.0 parts by weight, (11) 4.2 parts by weight, and (12) 6.4 parts by weight, respectively, of a powder of phenylphosphonic acid diethyl ester as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the phenylphosphonic acid diethyl ester was dispersedly contained in the expanded graphite particles.

These expanded graphite particles were subjected to roll forming by being passed through the reduction roll, thereby fabricating expanded graphite sheets having a thickness of 0.38 mm. These expanded graphite sheets were used as the heat-resistant sheet members 6. These heat-resistant sheet members 6 respectively contained (9) 1.0% by weight of phenylphosphonic acid diethyl ester and 99.0% by weight of expanded graphite, (10) 2.0% by weight of phenylphosphonic acid diethyl ester and 98.0% by weight of expanded graphite, (11) 4.0% by weight of phenylphosphonic acid diethyl ester and 96.0% by weight of expanded graphite, and (12) 6.0% by weight of phenylphosphonic acid diethyl ester and 94.0% by weight of expanded graphite.

The heat-resistant sheet members 6 thus fabricated and constituted of the above-described component compositions (9) to (12) were respectively cut into a width of 52 mm and a length of 655 mm.

The reinforcing members 5 each constituted by the metal wire net 4 similar to that of the above-described Examples were prepared, and the tubular base members 13 were fabricated by the heat-resistant sheet member 6 and the reinforcing member 5 in the same way as in the above-described Examples.

Heat-resistant sheet members 6 having the above-described component compositions (9) to (12) were prepared separately, and they were respectively cut into a width of 48 mm and a length of 193 mm.

In the same way as in the above-described Examples, each cylindrical woven metal wire net whose meshes were 4.0 mm was formed, and was passed between the pair of rollers 2 and 3, thereby fabricating the belt-shaped metal wire net 4 with a width of 52.0 mm and a length of 193 mm. Each of the four kinds of heat-resistant sheet members 6 was inserted into each belt-shaped metal wire net 4, and an assembly thereof was passed between the pair of rollers 14 and 15 so as to be formed integrally, thereby fabricating the outer-surface-layer forming member 16 in which the reinforcing member 5 and the heat-resistant sheet member 6 filling the meshes of the reinforcing member 5 and containing phenylphosphonic acid diethyl ester and expanded graphite were present in mixed form.

Thereafter, in the same way as in the above-described Examples, the spherical annular seal member 58 was fabricated which included the spherical annular base member 56 having the through hole 51 in its central portion and defined by the cylindrical inner surface 52, the partially convex spherical surface 53, and the large- and small-diameter-side annular end faces 54 and 55 of the partially convex spherical surface 53, as well as the outer surface 57 formed integrally on the partially convex spherical surface 53 of the spherical annular base member 56. By means of this compression forming, the spherical annular base member 56 was constructed so as to be provided with structural integrity as the heat-resistant sheet member 6 containing phenylphosphonic acid diethyl ester and expanded graphite and the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the heat-resistant material constituted by the heat-resistant sheet member 6 containing phenylphosphonic acid diethyl ester and expanded graphite, as well as the reinforcing member 5 constituted by the metal wire net 4 integrated with this heat-resistant material, were compressed and intertwined with each other. The partially convex spherical outer surface 59 exposed to the outside in the outer layer 57 was formed into a smooth surface in which the heat-resistant material containing phenylphosphonic acid diethyl ester and expanded graphite and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Examples 13 to 16

The acid-treated graphite material was fabricated in the same way as in the above-described Examples. While 100 parts by weight of the acid-treated graphite material was being agitated, the acid-treated graphite material was compounded with (13) 1.0 parts by weight, (14) 2.0 parts by weight, (15) 4.2 parts by weight, and (16) 6.4 parts by weight, respectively, of a powder of diphenylphosphinic acid as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the diphenylphosphinic acid among the components was dispersedly contained in the expanded graphite particles.

These expanded graphite particles were subjected to roll forming by being passed through the reduction roll, thereby fabricating expanded graphite sheets having a thickness of 0.38 mm. These expanded graphite sheets were used as the heat-resistant sheet members 6. These heat-resistant sheet members 6 respectively contained (13) 1.0% by weight of diphenylphosphinic acid and 99.0% by weight of expanded graphite, (14) 2.0% by weight of diphenylphosphinic acid and 98.0% by weight of expanded graphite, (15) 4.0% by weight of diphenylphosphinic acid and 96.0% by weight of expanded graphite, and (16) 6.0% by weight of diphenylphosphinic acid and 94.0% by weight of expanded graphite.

The heat-resistant sheet members 6 thus fabricated and constituted of the above-described component compositions (13) to (16) were respectively cut into a width of 52 mm and a length of 655 mm.

The reinforcing members 5 each constituted by the metal wire net 4 similar to that of the above-described Examples were prepared, and the tubular base members 13 were fabricated by the heat-resistant sheet member 6 and the reinforcing member 5 in the same way as in the above-described Examples.

Heat-resistant sheet members 6 having the above-described component compositions (13) to (16) were prepared separately, and they were respectively cut into a width of 48 mm and a length of 193 mm.

In the same way as in the above-described Examples, each cylindrical woven metal wire net whose meshes were 4.0 mm was formed, and was passed between the pair of rollers 2 and 3, thereby fabricating the belt-shaped metal wire net 4 with a width of 52.0 mm and a length of 193 mm. Each of the four kinds of heat-resistant sheet members 6 was inserted into each belt-shaped metal wire net 4, and an assembly thereof was passed between the pair of rollers 14 and 15 so as to be formed integrally, thereby fabricating the outer-surface-layer forming member 16 in which the reinforcing member 5 and the heat-resistant sheet member 6 filling the meshes of the reinforcing member 5 and containing diphenylphosphonic acid and expanded graphite were present in mixed form.

Thereafter, in the same way as in the above-described Examples, the spherical annular seal member 58 was fabricated which included the spherical annular base member 56 having the through hole 51 in its central portion and defined by the cylindrical inner surface 52, the partially convex spherical surface 53, and the large- and small-diameter-side annular end faces 54 and 55 of the partially convex spherical surface 53, as well as the outer surface 57 formed integrally on the partially convex spherical surface 53 of the spherical annular base member 56. By means of this compression forming, the spherical annular base member 56 was constructed so as to be provided with structural integrity as the heat-resistant sheet member 6 containing diphenylphosphonic acid and expanded graphite and the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the heat-resistant material constituted by the heat-resistant sheet member 6 containing diphenylphosphonic acid and expanded graphite, as well as the reinforcing member 5 constituted by the metal wire net 4 integrated with this heat-resistant material, were compressed and intertwined with each other. The partially convex spherical outer surface 59 exposed to the outside in the outer layer 57 was formed into a smooth surface in which the heat-resistant material containing diphenylphosphonic acid and expanded graphite and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Examples 17 to 20

The acid-treated graphite material was fabricated in the same way as in the above-described Examples. While 100 parts by weight of the acid-treated graphite material was being agitated, the acid-treated graphite material was compounded with (17) 1.0 parts by weight, (18) 2.0 parts by weight, (19) 4.2 parts by weight, and (20) 6.4 parts by weight, respectively, of a powder of phenylphosphinic acid as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the phenylphosphinic acid was dispersedly contained in the expanded graphite particles.

These expanded graphite particles were subjected to roll forming by being passed through the reduction roll, thereby fabricating expanded graphite sheets having a thickness of 0.38 mm. These expanded graphite sheets were used as the heat-resistant sheet members 6. These heat-resistant sheet members 6 respectively contained (17) 1.0% by weight of phenylphosphinic acid and 99.0% by weight of expanded graphite, (18) 2.0% by weight of phenylphosphinic acid and 98.0% by weight of expanded graphite, (19) 4.0% by weight of phenylphosphinic acid and 96.0% by weight of expanded graphite, and (20) 6.0% by weight of phenylphosphinic acid and 94.0% by weight of expanded graphite.

The heat-resistant sheet members 6 thus fabricated and constituted of the above-described component compositions (17) to (20) were respectively cut into a width of 52 mm and a length of 655 mm.

The reinforcing members 5 each constituted by the metal wire net 4 similar to that of the above-described Examples were prepared, and the tubular base members 13 were fabricated by the heat-resistant sheet member 6 and the reinforcing member 5 in the same way as in the above-described Examples.

Heat-resistant sheet members 6 having the above-described component compositions (17) to (20) were prepared separately, and they were respectively cut into a width of 48 mm and a length of 193 mm.

In the same way as in the above-described Examples, each cylindrical woven metal wire net whose meshes were 4.0 mm was formed, and was passed between the pair of rollers 2 and 3, thereby fabricating the belt-shaped metal wire net 4 with a width of 52.0 mm and a length of 193 mm. Each of the four kinds of heat-resistant sheet members 6 was inserted into each belt-shaped metal wire net 4, and an assembly thereof was passed between the pair of rollers 14 and 15 so as to be formed integrally, thereby fabricating the outer-surface-layer forming member 16 in which the reinforcing member 5 and the heat-resistant sheet member 6 filling the meshes of the reinforcing member 5 and containing phenylphosphonic acid and expanded graphite were present in mixed form.

Thereafter, in the same way as in the above-described Examples, the spherical annular seal member 58 was fabricated which included the spherical annular base member 56 having the through hole 51 in its central portion and defined by the cylindrical inner surface 52, the partially convex spherical surface 53, and the large- and small-diameter-side annular end faces 54 and 55 of the partially convex spherical surface 53, as well as the outer surface 57 formed integrally on the partially convex spherical surface 53 of the spherical annular base member 56. By means of this compression forming, the spherical annular base member 56 was constructed so as to be provided with structural integrity as the heat-resistant sheet member 6 containing phenylphosphonic acid and expanded graphite and the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the heat-resistant material constituted by the heat-resistant sheet member 6 containing phenylphosphonic acid and expanded graphite, as well as the reinforcing member 5 constituted by the metal wire net 4 integrated with this heat-resistant material, were compressed and intertwined with each other. The partially convex spherical outer surface 59 exposed to the outside in the outer layer 57 was formed into a smooth surface in which the heat-resistant material containing phenylphosphonic acid and expanded graphite and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Examples 21 to 24

The acid-treated graphite material was fabricated in the same way as in the above-described Examples. While 100 parts by weight of the acid-treated graphite material was being agitated, the acid-treated graphite material was compounded with (21) 1.0 parts by weight, (22) 2.0 parts by weight, (23) 4.2 parts by weight, and (24) 6.4 parts by weight, respectively, of a powder of a phosphoric ester, specifically diphenyl phosphate, as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the diphenyl phosphate was dispersedly contained in the expanded graphite particles.

These expanded graphite particles were subjected to roll forming by being passed through the reduction roll, thereby fabricating expanded graphite sheets having a thickness of 0.38 mm. These expanded graphite sheets were used as the heat-resistant sheet members 6. These heat-resistant sheet members 6 respectively contained (21) 1.0% by weight of diphenyl phosphate and 99.0% by weight of expanded graphite, (22) 2.0% by weight of diphenyl phosphate and 98.0% by weight of expanded graphite, (23) 4.0% by weight of diphenyl phosphate and 96.0% by weight of expanded graphite, and (24) 6.0% by weight of diphenyl phosphate and 94.0% by weight of expanded graphite.

The heat-resistant sheet members 6 thus fabricated and constituted of the above-described component compositions (21) to (24) were respectively cut into a width of 52 mm and a length of 655 mm.

The reinforcing members 5 each constituted by the metal wire net 4 similar to that of the above-described Examples were prepared, and the tubular base members 13 were fabricated by the heat-resistant sheet member 6 and the reinforcing member 5 in the same way as in the above-described Examples.

Heat-resistant sheet members 6 having the above-described component compositions (21) to (24) were prepared separately, and they were respectively cut into a width of 48 mm and a length of 193 mm.

In the same way as in the above-described Examples, each cylindrical woven metal wire net whose meshes were 4.0 mm was formed, and was passed between the pair of rollers 2 and 3, thereby fabricating the belt-shaped metal wire net 4 with a width of 52.0 mm and a length of 193 mm. Each of the four kinds of heat-resistant sheet members 6 was inserted into each belt-shaped metal wire net 4, and an assembly thereof was passed between the pair of rollers 14 and 15 so as to be formed integrally, thereby fabricating the outer-surface-layer forming member 16 in which the reinforcing member 5 and the heat-resistant sheet member 6 filling the meshes of the reinforcing member 5 and containing diphenyl phosphate and expanded graphite were present in mixed form.

Thereafter, in the same way as in the above-described Examples, the spherical annular seal member 58 was fabricated which included the spherical annular base member 56 having the through hole 51 in its central portion and defined by the cylindrical inner surface 52, the partially convex spherical surface 53, and the large- and small-diameter-side annular end faces 54 and 55 of the partially convex spherical surface 53, as well as the outer surface 57 formed integrally on the partially convex spherical surface 53 of the spherical annular base member 56. By means of this compression forming, the spherical annular base member 56 was constructed so as to be provided with structural integrity as the heat-resistant sheet member 6 containing diphenyl phosphate and expanded graphite and the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the heat-resistant material constituted by the heat-resistant sheet member 6 containing diphenyl phosphate and expanded graphite, as well as the reinforcing member 5 constituted by the metal wire net 4 integrated with this heat-resistant material, were compressed and intertwined with each other. The partially convex spherical outer surface 59 exposed to the outside in the outer layer 57 was formed into a smooth surface in which the heat-resistant material containing diphenyl phosphate and expanded graphite and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Examples 25 to 28

The acid-treated graphite material was fabricated in the same way as in the above-described Examples. While 100 parts by weight of the acid-treated graphite material was being agitated, the acid-treated graphite material was compounded by spraying with (25) 1.0 parts by weight, (26) 2.0 parts by weight, (27) 4.2 parts by weight, and (28) 6.4 parts by weight, respectively, of a solution of a phosphorous ester, specifically triphenyl phosphite, as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the triphenyl phosphite was dispersedly contained in the expanded graphite particles.

These expanded graphite particles were subjected to roll forming by being passed through the reduction roll, thereby fabricating expanded graphite sheets having a thickness of 0.38 mm. The expanded graphite sheets thus fabricated respectively contained (25) 1.0% by weight of triphenyl phosphite and 99.0% by weight of expanded graphite, (26) 2.0% by weight of triphenyl phosphite and 98.0% by weight of expanded graphite, (27) 4.0% by weight of triphenyl phosphite and 96.0% by weight of expanded graphite, and (28) 6.0% by weight of triphenyl phosphite and 94.0% by weight of expanded graphite.

The heat-resistant sheet members 6 thus fabricated and constituted of the above-described component compositions (25) to (28) were respectively cut into a width of 52 mm and a length of 655 mm.

The reinforcing members 5 each constituted by the metal wire net 4 similar to that of the above-described Examples were prepared, and the tubular base members 13 were fabricated by the heat-resistant sheet member 6 and the reinforcing member 5 in the same way as in the above-described Examples.

Heat-resistant sheet members 6 having the above-described component compositions (25) to (28) were prepared separately, and they were respectively cut into a width of 48 mm and a length of 193 mm.

In the same way as in the above-described Examples, each cylindrical woven metal wire net whose meshes were 4.0 mm was formed, and was passed between the pair of rollers 2 and 3, thereby fabricating the belt-shaped metal wire net 4 with a width of 52.0 mm and a length of 193 mm. Each of the four kinds of heat-resistant sheet members 6 was inserted into each belt-shaped metal wire net 4, and an assembly thereof was passed between the pair of rollers 14 and 15 so as to be formed integrally, thereby fabricating the outer-surface-layer forming member 16 in which the reinforcing member 5 and the heat-resistant sheet member 6 filling the meshes of the reinforcing member 5 and containing triphenyl phosphite and expanded graphite were present in mixed form.

Thereafter, in the same way as in the above-described Examples, the spherical annular seal member 58 was fabricated which included the spherical annular base member 56 having the through hole 51 in its central portion and defined by the cylindrical inner surface 52, the partially convex spherical surface 53, and the large- and small-diameter-side annular end faces 54 and 55 of the partially convex spherical surface 53, as well as the outer surface 57 formed integrally on the partially convex spherical surface 53 of the spherical annular base member 56. By means of this compression forming, the spherical annular base member 56 was constructed so as to be provided with structural integrity as the heat-resistant sheet member 6 containing triphenyl phosphite and expanded graphite and the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the heat-resistant material constituted by the heat-resistant sheet member 6 containing triphenyl phosphite and expanded graphite, as well as the reinforcing member 5 constituted by the metal wire net 4 integrated with this heat-resistant material, were compressed and intertwined with each other. The partially convex spherical outer surface 59 exposed to the outside in the outer layer 57 was formed into a smooth surface in which the heat-resistant material containing triphenyl phosphite and expanded graphite and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Examples 29 to 32

The acid-treated graphite material was fabricated in the same way as in the above-described Examples. While 100 parts by weight of the acid-treated graphite material was being agitated, the acid-treated graphite material was compounded with (29) 1.0 parts by weight, (30) 2.0 parts by weight, (31) 4.2 parts by weight, and (32) 6.4 parts by weight, respectively, of a powder of a hypophosphorous ester, specifically dimethyl phosphonite, as the organic phosphorus compound, and was agitated uniformly, thereby obtaining 4 kinds of mixtures. These mixtures were subjected to heating treatment for 5 seconds at a temperature of 1000° C. to produce cracked gas. The gaps between graphite layers were expanded by its gas pressure, thereby obtaining expanded graphite particles having an expansion rate of 240 times. In this expansion treatment process, the dimethyl phosphonite was dispersedly contained in the expanded graphite particles.

These expanded graphite particles were subjected to roll forming by being passed through the reduction roll, thereby fabricating expanded graphite sheets having a thickness of 0.38 mm. The expanded graphite sheets thus fabricated respectively contained (29) 1.0% by weight of dimethyl phosphonite and 99.0% by weight of expanded graphite, (30) 2.0% by weight of dimethyl phosphonite and 98.0% by weight of expanded graphite, (31) 4.0% by weight of dimethyl phosphonite and 96.0% by weight of expanded graphite, and (32) 6.0% by weight of dimethyl phosphonite and 94.0% by weight of expanded graphite.

The heat-resistant sheet members 6 thus fabricated and constituted of the above-described component compositions (29) to (32) were respectively cut into a width of 52 mm and a length of 655 mm.

The reinforcing members 5 each constituted by the metal wire net 4 similar to that of the above-described Examples were prepared, and the tubular base members 13 were fabricated by the heat-resistant sheet member 6 and the reinforcing member 5 in the same way as in the above-described Examples.

Heat-resistant sheet members 6 having the above-described component compositions (29) to (32) were prepared separately, and they were respectively cut into a width of 48 mm and a length of 193 mm.

In the same way as in the above-described Examples, each cylindrical woven metal wire net whose meshes were 4.0 mm was formed, and was passed between the pair of rollers 2 and 3, thereby fabricating the belt-shaped metal wire net 4 with a width of 52.0 mm and a length of 193 mm. Each of the four kinds of heat-resistant sheet members 6 was inserted into each belt-shaped metal wire net 4, and an assembly thereof was passed between the pair of rollers 14 and 15 so as to be formed integrally, thereby fabricating the outer-surface-layer forming member 16 in which the reinforcing member 5 and the heat-resistant sheet member 6 filling the meshes of the reinforcing member 5 and containing dimethyl phosphonite and expanded graphite were present in mixed form.

Thereafter, in the same way as in the above-described Examples, the spherical annular seal member 58 was fabricated which included the spherical annular base member 56 having the through hole 51 in its central portion and defined by the cylindrical inner surface 52, the partially convex spherical surface 53, and the large- and small-diameter-side annular end faces 54 and 55 of the partially convex spherical surface 53, as well as the outer surface 57 formed integrally on the partially convex spherical surface 53 of the spherical annular base member 56. By means of this compression forming, the spherical annular base member 56 was constructed so as to be provided with structural integrity as the heat-resistant sheet member 6 containing dimethyl phosphonite and expanded graphite and the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the heat-resistant material constituted by the heat-resistant sheet member 6 containing dimethyl phosphonite and expanded graphite, as well as the reinforcing member 5 constituted by the metal wire net 4 integrated with this heat-resistant material, were compressed and intertwined with each other. The partially convex spherical outer surface 59 exposed to the outside in the outer layer 57 was formed into a smooth surface in which the heat-resistant material containing dimethyl phosphonite and expanded graphite and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Examples 33 to 39

The heat-resistant sheet member 6 and the reinforcing member 5 constituted by the metal wire net 4, which were similar to those of Examples 5, 11, 15, 19, 23, 27, and 31, were prepared, and the tubular base members 13 were respectively fabricated from the heat-resistant sheet member 6 and the reinforcing member 5 in the same way as in the above-described Examples.

Heat-resistant sheet members 6 similar to the heat-resistant sheet members 6 for forming the aforementioned tubular base members 13 were prepared separately. An aqueous dispersion (25.5 wt. % of boron nitride, 4.5 wt. % of alumina, and 70 wt. % of water) containing as a solid content 30 wt. % of a lubricating composition constituted of 85 wt. % of boron nitride with an average particle size of 7 μm and 15 wt. % of alumina powder with an average particle size of 0.6 μm was applied by roller coating to one surface of each heat-resistant sheet member 6 cut into a width of 48 mm and a length of 193 mm, and was then dried. This coating operation was repeated three times to form the lubricating sliding layer 18 of the lubricating composition.

A belt-shaped metal wire net 4 similar to that of each of the above-described Examples was prepared, and each heat-resistant sheet member 6 having the lubricating sliding layer 18 of the lubricating composition was inserted into the belt-shaped metal wire net 4, and an assembly thereof was passed between the pair of rollers 19 and 20 so as to be formed integrally, thereby fabricating the outer-layer forming member 21 in which the reinforcing member 5 and the lubricating composition of the lubricating sliding layer 18, which filled the meshes of the reinforcing member 5, were present in mixed form on one surface thereof.

This outer-layer forming member 21 was wound around the outer peripheral surface of the aforementioned tubular base member 13 with the surface of the lubricating sliding layer 18 placed on the outer side, thereby preparing the cylindrical preform 22 in each case. Thereafter, in the same way as in the above-described Examples, the spherical annular seal member 58 was fabricated which included the spherical annular base member 56 having the through hole 51 in its central portion and defined by the cylindrical inner surface 52, the partially convex spherical surface 53, and the large- and small-diameter-side annular end faces 54 and 55 of the partially convex spherical surface 53, as well as the outer surface 57 formed integrally on the partially convex spherical surface 53 of the spherical annular base member 56.

By means of this compression forming, the spherical annular base member 57 was constructed so as to be provided with structural integrity as, on the one hand, one of the heat-resistant sheet member 6 (Example 33) containing phenylphosphonic acid and expanded graphite, the heat-resistant sheet member 6 (Example 34) containing phenylphosphonic acid diethyl ester and expanded graphite, the heat-resistant sheet member 6 (Example 35) containing diphenylphosphinic acid diethyl ester and expanded graphite, the heat-resistant sheet member 6 (Example 36) containing phenylphosphinic acid diethyl ester and expanded graphite, the heat-resistant sheet member 6 (Example 37) containing diphenyl phosphate and expanded graphite, the heat-resistant sheet member 6 (Example 38) containing triphenyl phosphite and expanded graphite, and the heat-resistant sheet member 6 (Example 39) containing dimethyl phosphonite and expanded graphite, and, on the other hand, the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the lubricating sliding layer 18 and the reinforcing member 5, which was constituted by the metal wire net 4 integrated with the lubricating sliding layer 18, were compressed and intertwined with each other. The outer layer 57 had the lubricating composition constituted of 85 wt. % of boron nitride and 15 wt. % of alumina, as well as the reinforcing member 5 constituted by the metal wire net 4 integrated with this lubricating composition in mixed form. The partially convex spherical outer surface 59 exposed to the outside in the outer layer 57 was formed into a smooth surface in which the lubricating composition and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Examples 40 to 46

The heat-resistant sheet member 6 and the reinforcing member 5 constituted by the metal wire net 4, which were similar to those of Examples 5, 11, 15, 19, 23, 27, and 31, were prepared, and the tubular base members 13 were respectively fabricated from the heat-resistant sheet member 6 and the reinforcing member 5 in the same way as in the above-described Examples.

Heat-resistant sheet members 6 similar to the heat-resistant sheet members 6 for forming the aforementioned tubular base members 13 were prepared separately. An aqueous dispersion (17 wt. % of boron nitride, 3 wt. % of alumina, 10 wt. % of polytetrafluoroethylene resin, and 70 wt. % of water) containing as a solid content 30 wt. % of a lubricating composition (56.7 wt. % of boron nitride, 10 wt. % of alumina, and 33.3 wt. % of polytetrafluoroethylene resin) obtained by allowing a lubricating composition constituted of 85 wt. % of boron nitride with an average particle size of 7 µm and 15 wt. % of alumina powder with an average particle size of 0.6 µm to contain 50 parts by weight of a polytetrafluoroethylene resin powder with an average particle size of 0.3 µm with respect to 100 parts by weight of that lubricating composition, was applied by roller coating to one surface of each heat-resistant sheet member 6 cut into a width of 48 mm and a length of 193 mm, and was then dried. This coating operation was repeated three times to form the lubricating sliding layer 18 of the lubricating composition.

A belt-shaped metal wire net 4 similar to that of each of the above-described Examples was prepared, and each heat-resistant sheet member 6 having the lubricating sliding layer 18 of the lubricating composition was inserted into the belt-shaped metal wire net 4, and an assembly thereof was passed between the pair of rollers 19 and 20 so as to be formed integrally, thereby fabricating the outer-layer forming member 21 in which the reinforcing member 5 and the lubricating composition of the lubricating sliding layer 18, which filled the meshes of the reinforcing member 5, were present in mixed form on one surface thereof.

This outer-layer forming member 21 was wound around the outer peripheral surface of the aforementioned tubular base member 13 with the surface of the lubricating sliding layer 18 placed on the outer side, thereby preparing the cylindrical preform 22 in each case. Thereafter, in the same way as in the above-described Examples, the spherical annular seal member 58 was fabricated which included the spherical annular base member 56 having the through hole 51 in its central portion and defined by the cylindrical inner surface 52, the partially convex spherical surface 53, and the large-and small-diameter-side annular end faces 54 and 55 of the partially convex spherical surface 53, as well as the outer surface 57 formed integrally on the partially convex spherical surface 53 of the spherical annular base member 56.

By means of this compression forming, the spherical annular base member 57 was constructed so as to be provided with structural integrity as, on the one hand, one of the heat-resistant sheet member 6 (Example 40) containing phenylphosphonic acid and expanded graphite, the heat-resistant sheet member 6 (Example 41) containing phenylphosphonic acid diethyl ester and expanded graphite, the heat-resistant sheet member 6 (Example 42) containing diphenylphosphinic acid diethyl ester and expanded graphite, the heat-resistant sheet member 6 (Example 43) containing phenylphosphinic acid diethyl ester and expanded graphite, the heat-resistant sheet member 6 (Example 44) containing diphenyl phosphate and expanded graphite, the heat-resistant sheet member 6 (Example 45) containing triphenyl phosphite and expanded graphite, and the heat-resistant sheet member 6 (Example 46) containing dimethyl phosphonite and expanded graphite, and, on the other hand, the reinforcing member 5 constituted by the metal wire net 4 were compressed and intertwined with each other. The spherical annular base member 56 had the reinforcing member 5 constituted by the compressed metal wire net 4, as well as the heat-resistant material constituted by the heat-resistant sheet member 6 filling the meshes of the metal wire net 4 of this reinforcing member 5 and compressed in such a manner as to be formed integrally with this reinforcing member 5 in mixed form. The outer layer 57 was constructed so as to be provided with structural integrity as the lubricating sliding layer 18 and the reinforcing member 5, which was constituted by the metal wire net 4 integrated with the lubricating sliding layer 18, were compressed and intertwined with each other. The outer layer 57 had the lubricating composition constituted of 56.7 wt. % of boron nitride, 10 wt. % of alumina, and 33.3 wt. % of polytetrafluoroethylene resin, as well as the reinforcing member 5 constituted by the metal wire net 4 integrated with this lubricating composition in mixed form. The partially convex spherical outer surface 59 exposed to the outside in the outer layer 57 was formed into a smooth surface in which the lubricating composition and the reinforcing member 5 were integrated in mixed form. The cylindrical inner surface 52 defining the through hole 51 was formed as a surface in which the compressed heat-resistant sheet member 6 was exposed, with the result that the heat-resistant material forming the spherical annular base member 56 was exposed. At the annular end faces 54 and 55, the portions projecting in the widthwise direction from the reinforcing member 5 were bent and extended in the heat-resistant sheet member 6, with the result that the annular end faces 54 and 55 were covered the heat-resistant material constituted by the heat-resistant sheet member 6.

Comparative Example 1

As the heat-resistant sheet member, an expanded graphite sheet ("Nicafilm (trade name)" made by Nippon Carbon Co., Ltd.) having a width of 52 mm, a length of 655 mm, and a thickness of 0.4 mm was prepared. As the reinforcing member, a belt-shaped metal wire net (35 mm wide and 320 mm long) similar to that of the above-described Example 1 was prepared. After the heat-resistant sheet member was convoluted by a one-circumference portion, the reinforcing member was superposed on the inner side of the heat-resistant sheet member, and the superposed assembly thereof was convoluted, thereby preparing a tubular base member in which the heat-resistant sheet member was located on the outermost periphery. In this tubular base member, widthwise opposite end portions of the heat-resistant sheet member respectively projected from the reinforcing member in the widthwise direction.

Another heat-resistant sheet member similar to the aforementioned heat-resistant sheet member was prepared separately, and was cut into a width of 48 mm and a length of 193 mm. An aqueous dispersion (25.5 wt. % of boron nitride, 4.5 wt. % of alumina, and 70 wt. % of water) containing as a solid content 30 wt. % of a lubricating composition (56.7 wt. % of boron nitride, 10 wt. % of alumina, and 33.3 wt. % of polytetrafluoroethylene resin) similar to that of the above-described Example 30, was applied by roller coating to one surface of this heat-resistant sheet member, and was then dried. This coating operation was repeated three times to form the lubricating sliding layer of the lubricating composition.

A belt-shaped metal wire net with a width of 52 mm and a length of 193 mm and similar to that of the above-described Example 1 was prepared. The heat-resistant sheet member having the lubricating sliding layer of the lubricating composition was inserted into the belt-shaped metal wire net, and an assembly thereof was passed between the pair of rollers so as to be formed integrally, thereby fabricating the outer-layer forming member in which the reinforcing member and the lubricating composition of the lubricating sliding layer, which filled the meshes of the reinforcing member, were present in mixed form. This outer-layer forming member was wound around the outer peripheral surface of the aforementioned tubular base member with the lubricating sliding layer of the lubricating composition placed on the outer side, thereby preparing the cylindrical preform. Thereafter, the spherical annular seal member was fabricated in the same way as in Example 1.

In the spherical annular seal member thus fabricated, the spherical annular base member was constructed so as to be provided with structural integrity as the heat-resistant sheet member and the reinforcing member constituted by the metal wire net were compressed and intertwined with each other. The spherical annular base member had the reinforcing member constituted by the compressed metal wire net, as well as the heat-resistant material filling the meshes of the metal wire net of this reinforcing member and compressed in such a manner as to be formed integrally with this reinforcing member in mixed form. The outer layer was constructed so as to be provided with structural integrity as the lubricating sliding layer and the reinforcing member, which was constituted by the metal wire net integrated with the lubricating sliding layer, were compressed and intertwined with each other. The outer layer had the lubricating composition constituted of 56.7 wt. % of boron nitride, 10 wt. % of alumina, and 33.3 wt. % of polytetrafluoroethylene resin, as well as the reinforcing member constituted by the metal wire net integrated with this lubricating composition in mixed form. The partially convex spherical outer surface exposed to the outside in the outer layer was formed into a smooth surface in which the lubricating composition and the reinforcing member were integrated in mixed form. The cylindrical inner surface defining the through hole was formed as a surface in which the compressed heat-resistant sheet member was exposed, with the result that the heat-resistant material forming the spherical annular base member was exposed. At the annular end faces, the portions projecting in the widthwise direction from the reinforcing member were bent and extended in the heat-resistant sheet member, with the result that the annular end faces were covered the heat-resistant material.

Comparative Example 2

An expanded graphite sheet similar to that of the above-described Comparative Example 1 was prepared. An aqueous solution of aluminum primary phosphate of a 25% concentration was prepared, and the overall surfaces of the aforementioned expanded graphite sheet were coated with this aqueous solution by roller coating, and the thus-coated expanded graphite sheet was then allowed to dry for 20 minutes at a temperature of 150° C. in a drying furnace so as to form a heat-resistant coating in an amount of 0.07 g/100 cm² and with a uniform thickness on the overall surfaces of the expanded graphite sheet. The sheet thus obtained was used as the heat-resistant sheet member, and this heat-resistant sheet member was cut into a width of 52 mm and a length of 655 mm.

As the reinforcing member, a belt-shaped metal wire net (35 mm wide and 320 mm long) similar to that of the above-described Example 1 was prepared. After the heat-resistant sheet member was convoluted by a one-circumference portion, this reinforcing member was superposed on the inner side of the heat-resistant sheet member, and the superposed assembly thereof was convoluted, thereby preparing a tubular base member in which the heat-resistant sheet member was located on the outermost periphery. In this tubular base member, widthwise opposite end portions of the heat-resistant sheet member respectively projected from the reinforcing member in the widthwise direction.

Another heat-resistant sheet member similar to the aforementioned heat-resistant sheet member was prepared separately, and was cut into a width of 48 mm and a length of 193 mm. An aqueous dispersion (25.5 wt. % of boron nitride, 4.5 wt. % of alumina, and 70 wt. % of water) containing as a solid content 30 wt. % of a lubricating composition (56.7 wt. % of boron nitride, 10 wt. % of alumina, and 33.3 wt. % of polytetrafluoroethylene resin) similar to that of the above-described Example 30, was applied by roller coating to one surface of this heat-resistant sheet member, and was then dried. This coating operation was repeated three times to form the lubricating sliding layer of the lubricating composition.

A belt-shaped metal wire net with a width of 52 mm and a length of 193 mm and similar to that of the above-described Example 1 was prepared. The heat-resistant sheet member having the lubricating sliding layer of the lubricating composition was inserted into the belt-shaped metal wire net, and an assembly thereof was passed between the pair of rollers so as to be formed integrally, thereby fabricating the outer-layer forming member in which the reinforcing member and the lubricating composition of the lubricating sliding layer, which filled the meshes of the reinforcing member, were present in mixed form. This outer-layer forming member was wound around the outer peripheral surface of the aforementioned tubular base member with the lubricating sliding layer of the lubricating composition placed on the outer side, thereby preparing the cylindrical preform. Thereafter, the spherical annular seal member was fabricated in the same way as in Example 1.

In the spherical annular seal member thus fabricated, the spherical annular base member was constructed so as to be provided with structural integrity as the heat-resistant sheet member having a heat-resistant coating constituted of aluminum primary phosphate and the reinforcing member constituted by the metal wire net were compressed and intertwined with each other. The spherical annular base member had the reinforcing member constituted by the compressed metal wire net, as well as the heat-resistant material filling the meshes of the metal wire net of this reinforcing member and compressed in such a manner as to be formed integrally with this reinforcing member in mixed form. The outer layer was constructed so as to be provided with structural integrity as the lubricating sliding layer and the reinforcing member, which was constituted by the metal wire net integrated with the lubricating sliding layer, were compressed and intertwined with each other. The outer layer had the lubricating composition constituted of 56.7 wt. % of boron nitride, 10 wt. % of alumina, and 33.3 wt. % of polytetrafluoroethylene resin, as well as the reinforcing member constituted by the metal wire net integrated with this lubricating composition in mixed form. The partially convex spherical outer surface exposed to the outside in the outer layer was formed into a smooth surface in which the lubricating composition and the reinforcing member were integrated in mixed form. The cylindrical inner surface defining the through hole was formed as a surface in which the compressed heat-resistant sheet member was exposed, with the result that the heat-resistant coating constituted of aluminum primary phosphate was exposed. At the annular end faces, the portions projecting in the widthwise direction from the reinforcing member were bent and extended in the heat-resistant sheet member, with the result that the annular end faces were covered the heat-resistant coating constituted of aluminum primary phosphate.

Comparative Example 3

An expanded graphite sheet similar to that of the above-described Comparative Example 1 was prepared. An aqueous solution of aluminum primary phosphate of a 25% concentration was prepared, and 5 g of calcium fluoride with an average particle size of 4 μm was mixed in 30 g of this aqueous solution, and a mixture was thereby obtained. The overall surfaces of the aforementioned expanded graphite sheet were coated with this mixture by roller coating, and the thus-coated expanded graphite sheet was then allowed to dry for 20 minutes at a temperature of 150° C. in a drying furnace so as to form a heat-resistant coating (the weight ratio between calcium fluoride and aluminum primary phosphate being 1:1.5) with a uniform thickness of 0.3 g/100 cm$^2$ on the overall surfaces of the expanded graphite sheet. The sheet thus obtained was used as the heat-resistant sheet member having the heat-resistant coating, and this heat-resistant sheet member was cut into a width of 52 mm and a length of 655 mm.

As the reinforcing member, a belt-shaped metal wire net (35 mm wide and 320 mm long) similar to that of the above-described Example 1 was prepared. After the heat-resistant sheet member was convoluted by a one-circumference portion, this reinforcing member was superposed on the inner side of the heat-resistant sheet member, and the superposed assembly thereof was convoluted, thereby preparing a tubular base member in which the heat-resistant sheet member was located on the outermost periphery. In this tubular base member, widthwise opposite end portions of the heat-resistant sheet member respectively projected from the reinforcing member in the widthwise direction.

Another heat-resistant sheet member similar to the aforementioned heat-resistant sheet member was prepared separately, and was cut into a width of 48 mm and a length of 193 mm. An aqueous dispersion (25.5 wt. % of boron nitride, 4.5 wt. % of alumina, and 70 wt. % of water) containing as a solid content 30 wt. % of a lubricating composition (56.7 wt. % of boron nitride, 10 wt. % of alumina, and 33.3 wt. % of polytetrafluoroethylene resin) similar to that of the above-described Example 30, was applied by roller coating to one surface of this heat-resistant sheet member, and was then dried. This coating operation was repeated three times to form the lubricating sliding layer of the lubricating composition.

A belt-shaped metal wire net with a width of 52 mm and a length of 193 mm and similar to that of the above-described Example 1 was prepared. The heat-resistant sheet member having the lubricating sliding layer of the lubricating composition was inserted into the belt-shaped metal wire net, and an assembly thereof was passed between the pair of rollers so as to be formed integrally, thereby fabricating the outer-layer forming member in which the reinforcing member and the lubricating composition of the lubricating sliding layer, which filled the meshes of the reinforcing member, were present in mixed form. This outer-layer forming member was wound around the outer peripheral surface of the aforementioned tubular base member with the lubricating sliding layer of the lubricating composition placed on the outer side, thereby preparing the cylindrical preform. Thereafter, the spherical annular seal member was fabricated in the same way as in Example 1.

In the spherical annular seal member thus fabricated, the spherical annular base member was constructed so as to be provided with structural integrity as the heat-resistant sheet member having a heat-resistant coating constituted of aluminum primary phosphate and calcium fluoride as well as the reinforcing member constituted by the metal wire net were compressed and intertwined with each other. The spherical annular base member had the reinforcing member constituted by the compressed metal wire net, as well as the heat-resistant material filling the meshes of the metal wire net of this reinforcing member and compressed in such a manner as to be formed integrally with this reinforcing member in mixed form. The outer layer was constructed so as to be provided with structural integrity as the lubricating sliding layer and the reinforcing member, which was constituted by the metal wire net integrated with the lubricating sliding layer, were compressed and intertwined with each other. The outer layer had the lubricating composition constituted of 56.7 wt. % of boron nitride, 10 wt. % of alumina, and 33.3 wt. % of polytetrafluoroethylene resin, as well as the reinforcing member constituted by the metal wire net integrated with this lubricating composition in mixed form. The partially convex spherical outer surface exposed to the outside in the outer layer was formed into a smooth surface in which the lubricating composition and the reinforcing member were integrated in mixed form. The cylindrical inner surface defining the through hole was formed as a surface in which the compressed heat-resistant sheet member was exposed, with the result that the heat-resistant coating constituted of aluminum primary phosphate was exposed. At the annular end faces, the portions projecting in the widthwise direction from the reinforcing member were bent and extended in the heat-resistant sheet member, with the result that the annular end faces were covered the heat-resistant coating constituted of aluminum primary phosphate and calcium fluoride.

With respect to the spherical annular seal members in accordance with the above-described Examples and Comparative Examples, tests were conducted on the frictional torque (N·m) for each cycle, the presence or absence of the occurrence of abnormal noise, and the weight loss (weight reduction) by using the exhaust pipe spherical joint shown in FIG. 18, and its results are discussed below.

<Test Conditions>
Pressing force using coil springs (spring set force): 706 N
Angle of oscillation: ±3°
Oscillation frequency: 12 hertz (Hz)
Ambient temperature (the outer surface temperature of the concave spherical surface portion 302 shown in FIG. 18):
from room temperature to 720° C.

<Test Method>
After 45,000 oscillating motions are performed at room temperature by setting an oscillating motion at ±3° at a frequency of 12 Hz as a unit of oscillation, the ambient temperature is raised to a temperature of 720° C. while continuing the oscillating motions (the number of oscillating motions during the temperature rise being 45,000). When the ambient temperature reached the temperature of 720° C., 115,000 oscillating motions are performed. Finally, the ambient temperature is allowed to drop to room temperature while continuing the oscillating motions (the number of oscillating motions during the temperature drop being 45,000). The combined total of 250,000 oscillating motions is set as one cycle, and four cycles are performed.

The evaluation of the presence or absence of the occurrence of abnormal frictional noise was conducted as follows.
Evaluation Code A: No abnormal frictional noise occurred.
Evaluation Code B: Abnormal frictional noise is slightly heard with the ear brought close to the test piece.
Evaluation Code C: Although the noise is generally difficult to discern from a fixed position (a position 1.5 m distant from the test piece) since it is blanketed by the noises of the living environment, the noise can be discerned as abnormal frictional noise by a person engaged in the test.
Evaluation Code D: The noise can be recognized as abnormal frictional noise (unpleasant sound) by anybody from the fixed position.

As for the amount of gas leakage (litter/min), an opening of one exhaust pipe 100 connected to the exhaust pipe spherical joint shown in FIG. 18 was closed, and dry air was allowed to flow into the joint portion from the other exhaust pipe 300 under a pressure of 0.5 kgf/cm². The amount of leakage from the joint portion (sliding contact portions between the partially convex spherical outer surface 53 of the spherical annular seal member 58 and the flared portion 301, fitting portions between the cylindrical inner surface 52 of the spherical annular seal member 58 and the pipe end portion 101 of the exhaust pipe 100, and abutting portions between the end face 54 and the flange 200 provided uprightly on the exhaust pipe 100) was measured by means of a flowmeter after testing with 1,000,000 oscillating motions.

Tables 1 and 2 show the test results of the spherical annular seal members 58 in Examples 1 to 8 obtained by the above-described test method. Table 3 shows the test results of the spherical annular seal members 58 in Examples 9 to 12. Table 4 shows the test results of the spherical annular seal members 58 in Examples 13 to 16. Table 5 shows the test results of the spherical annular seal members 58 in Examples 17 to 20. Table 6 shows the test results of the spherical annular seal members 58 in Examples 21 to 24. Table 7 shows the test results of the spherical annular seal members 58 in Examples 25 to 28. Table 8 shows the test results of the spherical annular seal members 58 in Examples 29 to 32. Table 9 shows the test results of the spherical annular seal members 58 in Examples 33 to 36. Table 10 shows the test results of the spherical annular seal members 58 in Examples 37 to 39. Table 11 shows the test results of the spherical annular seal members 58 in Examples 40 to 43. Table 12 shows the test results of the spherical annular seal members 58 in Examples 44 to 46. Table 13 shows the test results of the spherical annular seal members in Comparative Examples 1 to 3.

TABLE 1

| | Examples | | | |
|---|---|---|---|---|
| | 1 | 2 | 3 | 4 |
| (Component Composition of Heat-resistant Material) | | | | |
| Expanded graphite | 99.9 | 99.5 | 99.0 | 98.0 |
| Organic phosphorus compound: | | | | |
| Phenylphosphonic acid | 0.1 | 0.5 | 1.0 | 2.0 |
| (Test Results) | | | | |
| Frictional torque | 9.0-12.5 | 9.1-12.2 | 9.0-12.3 | 9.2-12.4 |
| Determination of abnormal frictional noise | A-B | A-B | A-B | A-B |
| Weight of seal member before test | 44.9 | 44.9 | 45.2 | 45.1 |
| Weight of seal member after Test | 39.1 | 39.1 | 39.8 | 39.7 |
| Weight reduction rate (%) | 13 | 13 | 12 | 12 |
| Amount of gas leakage | 0.45 | 0.43 | 0.42 | 0.38 |

TABLE 2

| | Examples | | | |
|---|---|---|---|---|
| | 5 | 6 | 7 | 8 |
| (Component Composition of Heat-resistant Material) | | | | |
| Expanded graphite | 96.0 | 94.0 | 92.0 | 90.0 |
| Organic phosphorus | | | | |

TABLE 2-continued

|  | Examples | | | |
| --- | --- | --- | --- | --- |
|  | 5 | 6 | 7 | 8 |
| compound: | | | | |
| Phenylphosphonic acid | 4.0 | 6.0 | 8.0 | 10.0 |
| (Test Results) | | | | |
| Frictional torque | 9.0-11.8 | 9.1-12.0 | 9.3-12.2 | 9.3-12.4 |
| Determination of abnormal frictional noise | A-B | A-B | A-B | A-B |
| Weight of seal member before test | 45.9 | 45.6 | 45.6 | 45.8 |
| Weight of seal member after Test | 41.0 | 40.4 | 40.3 | 40.1 |
| Weight reduction rate (%) | 10.7 | 11.4 | 11.6 | 12.4 |
| Amount of gas leakage | 0.32 | 0.34 | 0.34 | 0.38 |

TABLE 3

|  | Examples | | | |
| --- | --- | --- | --- | --- |
|  | 9 | 10 | 11 | 12 |
| (Component Composition of Heat-resistant Material) | | | | |
| Expanded graphite | 99.0 | 98.0 | 96.0 | 94.0 |
| Organic phosphorus compound: | | | | |
| Phenylphosphonic acid diethyl ester | 1.0 | 2.0 | 4.0 | 6.0 |
| (Test Results) | | | | |
| Frictional torque | 9.2-12.3 | 9.5-12.7 | 9.0-11.8 | 9.2-12.0 |
| Determination of abnormal frictional noise | A-B | A-B | A-B | A-B |
| Weight of seal member before test | 45.7 | 45.6 | 45.6 | 45.8 |
| Weight of seal member after Test | 40.2 | 40.7 | 40.8 | 40.5 |
| Weight reduction rate (%) | 12 | 10.7 | 10.5 | 11.6 |
| Amount of gas leakage | 0.43 | 0.40 | 0.33 | 0.35 |

TABLE 4

|  | Examples | | | |
| --- | --- | --- | --- | --- |
|  | 13 | 14 | 15 | 16 |
| (Component Composition of Heat-resistant Material) | | | | |
| Expanded graphite | 99.0 | 98.0 | 96.0 | 94.0 |
| Organic phosphorus compound: | | | | |
| Diphenylphosphinic acid | 1.0 | 2.0 | 4.0 | 6.0 |
| (Test Results) | | | | |
| Frictional torque | 9.1-12.2 | 9.2-12.3 | 9.0-11.8 | 9.2-12.0 |
| Determination of abnormal frictional noise | A-B | A-B | A-B | A-B |
| Weight of seal member before test | 45.8 | 45.8 | 45.6 | 45.6 |
| Weight of seal member after Test | 40.4 | 40.7 | 40.7 | 40.4 |
| Weight reduction rate (%) | 11.8 | 11.1 | 10.7 | 11.4 |
| Amount of gas leakage | 0.41 | 0.42 | 0.34 | 0.36 |

TABLE 5

|  | Examples | | | |
| --- | --- | --- | --- | --- |
|  | 17 | 18 | 19 | 20 |
| (Component Composition of Heat-resistant Material) | | | | |
| Expanded graphite | 99.0 | 98.0 | 96.0 | 94.0 |
| Organic phosphorus compound: | | | | |
| Phenylphosphinic acid | 1.0 | 2.0 | 4.0 | 6.0 |
| (Test Results) | | | | |
| Frictional torque | 9.1-12.5 | 9.3-12.2 | 9.0-11.7 | 9.2-12.0 |
| Determination of abnormal frictional noise | A-B | A-B | A-B | A-B |
| Weight of seal member before test | 45.8 | 45.8 | 45.6 | 45.8 |
| Weight of seal member after Test | 40.3 | 40.7 | 40.7 | 40.4 |
| Weight reduction rate (%) | 12.0 | 11.1 | 10.7 | 11.8 |
| Amount of gas leakage | 0.44 | 0.42 | 0.32 | 0.34 |

TABLE 6

|  | Examples | | | |
| --- | --- | --- | --- | --- |
|  | 21 | 22 | 23 | 24 |
| (Component Composition of Heat-resistant Material) | | | | |
| Expanded graphite | 99.0 | 98.0 | 96.0 | 94.0 |
| Organic phosphorus compound: (Phosphoric acid ester) | | | | |
| Diphenyl phosphate | 1.0 | 2.0 | 4.0 | 6.0 |
| (Test Results) | | | | |
| Frictional torque | 9.0-12.3 | 9.3-12.2 | 9.0-11.8 | 9.2-12.2 |
| Determination of abnormal frictional noise | A-B | A-B | A-B | A-B |
| Weight of seal member before test | 45.8 | 45.8 | 45.6 | 45.6 |
| Weight of seal member after Test | 40.4 | 40.7 | 40.7 | 40.4 |
| Weight reduction rate (%) | 11.8 | 11.1 | 10.7 | 11.4 |
| Amount of gas leakage | 0.44 | 0.40 | 0.34 | 0.36 |

TABLE 7

|  | Examples | | | |
| --- | --- | --- | --- | --- |
|  | 25 | 26 | 27 | 28 |
| (Component Composition of Heat-resistant Material) | | | | |
| Expanded graphite | 99.0 | 98.0 | 96.0 | 94.0 |
| Organic phosphorus compound: (Phosphorous acid ester) | | | | |
| Triphenyl phosphite | 1.0 | 2.0 | 4.0 | 6.0 |
| (Test Results) | | | | |
| Frictional torque | 9.2-12.6 | 9.3-12.2 | 9.0-11.8 | 9.2-12.2 |
| Determination of abnormal frictional noise | A-B | A-B | A-B | A-B |
| Weight of seal member before test | 45.6 | 45.8 | 45.6 | 45.8 |

TABLE 7-continued

|  | Examples | | | |
| --- | --- | --- | --- | --- |
|  | 25 | 26 | 27 | 28 |
| Weight of seal member after Test | 40.0 | 40.3 | 40.6 | 40.5 |
| Weight reduction rate (%) | 12.2 | 12.0 | 11.0 | 11.6 |
| Amount of gas leakage | 0.46 | 0.44 | 0.40 | 0.38 |

TABLE 8

|  | Examples | | | |
| --- | --- | --- | --- | --- |
|  | 29 | 30 | 31 | 32 |
| (Component Composition of Heat-resistant Material) | | | | |
| Expanded graphite | 99.0 | 98.0 | 96.0 | 94.0 |
| Organic phosphorus compound: (Hypophosphorous acid ester) | | | | |
| Dimethyl phosphonite | 1.0 | 2.0 | 4.0 | 6.0 |
| (Test Results) | | | | |
| Frictional torque | 9.3-12.6 | 9.3-12.4 | 9.0-12.0 | 9.0-12.4 |
| Determination of abnormal frictional noise | A-B | A-B | A-B | A-B |
| Weight of seal member before test | 45.8 | 45.6 | 45.6 | 45.8 |
| Weight of seal member after Test | 40.1 | 40.1 | 40.5 | 40.5 |
| Weight reduction rate (%) | 12.4 | 12.1 | 11.2 | 11.6 |
| Amount of gas leakage | 0.48 | 0.46 | 0.44 | 0.40 |

TABLE 9

|  | Examples | | | |
| --- | --- | --- | --- | --- |
|  | 33 | 34 | 35 | 36 |
| (Component Composition of Heat-resistant Material) | | | | |
| Expanded graphite | 96.0 | 96.0 | 96.0 | 96.0 |
| Phenylphosphonic acid | 4.0 | | | |
| Phenylphosphonic acid diethyl ester | | 4.0 | | |
| Diphenylphosphinic acid | | | 4.0 | |
| Phenylphosphinic acid | | | | 4.0 |
| Diphenyl phosphate | | | | |
| Triphenyl phosphite | | | | |
| Dimethyl phosphonite | | | | |
| (Lubricating Composition of Outer Layer) | | | | |
| Boron nitride | | | 85 | |
| Alumina | | | 15 | |
| (Test Results) | | | | |
| Frictional torque | 8.0-11.6 | 8.0-11.8 | 8.2-11.6 | 8.2-12.0 |
| Determination of abnormal frictional noise | A | A | A | A |
| Weight of seal member before test | 46.5 | 46.3 | 46.2 | 46.3 |
| Weight of seal member after Test | 41.5 | 41.4 | 41.2 | 41.4 |
| Weight reduction rate (%) | 10.8 | 10.6 | 10.8 | 10.6 |
| Amount of gas leakage | 0.32 | 0.33 | 0.34 | 0.35 |

TABLE 10

|  | Examples | | |
| --- | --- | --- | --- |
|  | 37 | 38 | 39 |
| (Component Composition of Heat-resistant Material) | | | |
| Expanded graphite | 96.0 | 96.0 | 96.0 |
| Phenylphosphonic acid | | | |
| Phenylphosphonic acid diethyl ester | | | |
| Diphenylphosphinic acid | | | |
| Phenylphosphinic acid | | | |
| Diphenyl phosphate | 4.0 | | |
| Triphenyl phosphite | | 4.0 | |
| Dimethyl phosphonite | | | 4.0 |
| (Lubricating Composition of Outer Layer) | | | |
| Boron nitride | | 85 | |
| Alumina | | 15 | |
| (Test Results) | | | |
| Frictional torque | 8.2-11.7 | 8.4-11.6 | 8.4-11.8 |
| Determination of abnormal frictional noise | A | A | A |
| Weight of seal member before test | 46.4 | 46.3 | 46.4 |
| Weight of seal member after Test | 41.4 | 41.2 | 41.2 |
| Weight reduction rate (%) | 10.7 | 11.0 | 11.2 |
| Amount of gas leakage | 0.34 | 0.38 | 0.42 |

TABLE 11

|  | Examples | | | |
| --- | --- | --- | --- | --- |
|  | 40 | 41 | 42 | 43 |
| (Component Composition of Heat-resistant Material) | | | | |
| Expanded graphite | 96.0 | 96.0 | 96.0 | 96.0 |
| Phenylphosphonic acid | 4.0 | | | |
| Phenylphosphonic acid diethyl ester | | 4.0 | | |
| Diphenylphosphinic acid | | | 4.0 | |
| Phenylphosphinic acid | | | | 4.0 |
| Diphenyl phosphate | | | | |
| Triphenyl phosphite | | | | |
| Dimethyl phosphonite | | | | |
| (Lubricating Composition of Outer Layer) | | | | |
| Boron nitride | | 56.7 | | |
| Alumina | | 10 | | |
| PTFE | | 33.3 | | |
| (Test Results) | | | | |
| Frictional torque | 7.6-11.6 | 7.8-11.8 | 7.9-11.8 | 8.0-12.0 |
| Determination of abnormal frictional noise | A | A | A | A |
| Weight of seal member before test | 46.5 | 46.3 | 46.2 | 46.3 |
| Weight of seal member after Test | 41.5 | 41.4 | 41.2 | 41.4 |
| Weight reduction rate (%) | 10.8 | 10.6 | 10.8 | 10.6 |
| Amount of gas leakage | 0.32 | 0.33 | 0.34 | 0.35 |

In Table 11, PTFE represents polytetrafluoroethylene resin.

TABLE 12

| | Examples | | |
|---|---|---|---|
| | 44 | 45 | 46 |
| (Component Composition of Heat-resistant Material) | | | |
| Expanded graphite | 96.0 | 96.0 | 96.0 |
| Phenylphosphonic acid | | | |
| Phenylphosphonic acid diethyl ester | | | |
| Diphenylphosphinic acid | | | |
| Phenylphosphinic acid | | | |
| Diphenyl phosphate | 4.0 | | |
| Triphenyl phosphite | | 4.0 | |
| Dimethyl phosphonite | | | 4.0 |
| (Lubricating Composition of Outer Layer) | | | |
| Boron nitride | | 56.7 | |
| Alumina | | 10 | |
| PTFE | | 33.3 | |
| (Test Results) | | | |
| Frictional torque | 7.8-11.6 | 7.4-11.6 | 7.5-11.8 |
| Determination of abnormal frictional noise | A | A | A |
| Weight of seal member before test | 46.4 | 46.3 | 46.4 |
| Weight of seal member after Test | 41.4 | 41.2 | 41.2 |
| Weight reduction rate (%) | 10.7 | 11.0 | 11.2 |
| Amount of gas leakage | 0.34 | 0.38 | 0.42 |

In Table 12, PTFE represents polytetrafluoroethylene resin.

TABLE 13

| | Comparative Examples | | |
|---|---|---|---|
| | 1 | 2 | 3 |
| (Test Results) | | | |
| Frictional torque | 7.8-12.0 | 8.0-11.5 | 8.1-12.2 |
| Determination of abnormal frictional noise | A | A | A |
| Weight of seal member before test | 47.5 | 47.8 | 48.2 |
| Weight of seal member after Test | 30.4 | 34.4 | 40.9 |
| Weight reduction rate (%) | 36 | 28 | 24 |
| Amount of gas leakage | 5.8 | 1.8 | 1.3 |

From the weight (g) of the seal member before the test and the weight (g) of the seal member after the test in the test results, it can be appreciated that in the case of the spherical annular seal members in accordance with the Examples, the weight reduction ratio due to the oxidative wear of expanded graphite making up the seal members was not more than 13% even under a high-temperature condition exceeding 700° C., and that the spherical annular seal members in accordance with the Examples exhibit excellent resistance to oxidation in comparison with the Comparative Examples. In addition, since the heat-resistant sheet member composed of the organic phosphorus compound and expanded graphite has flexibility which the ordinary expanded graphite sheet has, it was possible to effect the bending process in the method of manufacturing a spherical annular seal member without causing any trouble.

The invention claimed is:

1. A spherical annular seal member, comprising: a spherical annular base member defined by a cylindrical inner surface, a partially convex spherical surface, and large- and small-diameter-side annular end faces of said partially convex spherical surface; and an outer layer formed integrally with said partially convex spherical surface of said spherical annular base member, said spherical annular base member including a reinforcing member made from a compressed metal wire net and a heat-resistant material filling meshes of said metal wire net of said reinforcing member, compressed in such a manner as to be formed integrally with said reinforcing member in mixed form, and containing expanded graphite and an organic phosphorus compound, said outer layer including a heat-resistant material containing expanded graphite and an organic phosphorus compound, and the reinforcing member constituted by the metal wire net integrated with said heat-resistant material in mixed form, an outer surface of said partially convex spherical surface exposed to an outside in said outer layer being formed into a smooth surface in which said heat-resistant material and said reinforcing member are integrated in mixed form, wherein said heat-resistant material contains 0.1 to 10.0 wt. % of said organic phosphorus compound and 90.0 to 99.9 wt. % of said expanded graphite, and said organic phosphorus compound is selected from the group consisting of an organic phosphonic acid, an organic phosphonic ester, and a phosphoric ester, the organic phosphonic acid or the organic phosphonic ester being represented by the following general formula (1):

(1)

wherein $R^1$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^2$ and $R^3$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and the phosphoric ester being represented by the following general formula (3):

(3)

wherein each of $R^7$, $R^8$, and $R^9$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, providing that a case where all of them are hydrogen atoms is excluded.

2. A spherical annular seal member, comprising: a spherical annular base member defined by a cylindrical inner surface, a partially convex spherical surface, and large- and small-diameter-side annular end faces of said partially convex spherical surface; and an outer layer formed integrally with said partially convex spherical surface of said spherical annular base member, said spherical annular base member including a reinforcing member made from a compressed metal wire net and a heat-resistant material filling meshes of said metal wire net of said reinforcing member, compressed in such a manner as to be formed integrally with said reinforcing member in mixed form, and containing expanded graphite and an organic phosphorus compound, said outer layer including a lubricating composition constituted of at least boron nitride and at least one of alumina and silica, and the reinforcing member constituted by the metal wire net integrated with said lubricating composition in mixed form, an outer surface of said partially convex spherical surface exposed to an outside in said outer layer being formed into a smooth lubricating sliding surface in which said lubricating composition and said reinforcing member are integrated in mixed form, wherein said heat-resistant material containing 0.1 to 10.0 wt. % of said organic phosphorus compound and 90.0 to 99.9 wt. % of said expanded graphite, and said organic phosphorus compound is selected from the group consisting of an organic phosphonic acid, an organic phosphonic ester, and a phosphoric ester, the organic phosphonic acid or the organic phosphonic ester being represented by the following general formula (1):

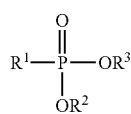

(1)

wherein $R^1$ is an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and each of $R^2$ and $R^3$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, and the phosphoric ester being represented by the following general formula (3):

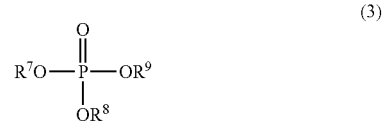

(3)

wherein each of $R^7$, $R^8$, and $R^9$ is a hydrogen atom, an alkyl group having a carbon number of 1 to 10, an aryl group having a carbon number of 6 to 18, or an aralkyl group consisting of an alkylene portion having a carbon number of 1 to 10 and an aryl portion having a carbon number of 6 to 18, providing that a case where all of them are hydrogen atoms is excluded.

3. A spherical annular seal member according to claim 2, wherein said lubricating composition contains 70-90 wt. % of boron nitride and 10-30 wt. % of at least one of alumina and silica.

4. A spherical annular seal member according to claim 2 or 3, wherein said lubricating composition further contains polytetrafluoroethylene resin.

5. A spherical annular seal member according to claim 2 or 3, wherein said lubricating composition contains a mixture consisting of 70-90 wt. % of boron nitride and 10-30 wt. % of at least one of alumina and silica, and further contains not more than 200 parts by weight of polytetrafluoroethylene resin with respect to 100 parts by weight of said mixture.

6. A spherical annular seal member according to claim 2 or 3, wherein said lubricating composition contains a mixture consisting of 70-90 wt. % of boron nitride and 10-30 wt. % of at least one of alumina and silica, and further contains 50 to 150 parts by weight of polytetrafluoroethylene resin with respect to 100 parts by weight of said mixture.

7. A spherical annular seal member according to any one of claims 1 to 3, wherein said heat-resistant material containing said expanded graphite and said organic phosphorus compound of said spherical annular base member is exposed on said cylindrical inner surface.

8. A spherical annular seal member according to any one of claims 1 to 3, wherein said reinforcing member constituted by said metal wire net of said spherical annular base member is exposed on said cylindrical inner surface.

9. A spherical annular seal member according to any one of claims 1 to 3, wherein said heat-resistant material containing said expanded graphite and said organic phosphorus compound of said spherical annular base member is exposed on at least one of said annular end faces.

\* \* \* \* \*